(12) United States Patent
Hirakawa

(10) Patent No.: US 11,748,892 B2
(45) Date of Patent: Sep. 5, 2023

(54) VIDEO IMAGE PROCESSING DEVICE, VIDEO IMAGE ANALYSIS SYSTEM, METHOD, AND PROGRAM

(71) Applicant: NEC Corporation, Tokyo (JP)

(72) Inventor: Yasufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/228,816

(22) Filed: Apr. 13, 2021

(65) Prior Publication Data

US 2021/0233254 A1 Jul. 29, 2021

Related U.S. Application Data

(63) Continuation of application No. 16/489,374, filed as application No. PCT/JP2018/006229 on Feb. 21, 2018, now abandoned.

(30) Foreign Application Priority Data

Mar. 31, 2017 (JP) .................................. 2017-070677

(51) Int. Cl.
*G06T 7/20* (2017.01)
*G06F 3/14* (2006.01)
*G06T 11/00* (2006.01)
*H04N 5/272* (2006.01)

(52) U.S. Cl.
CPC .................. *G06T 7/20* (2013.01); *G06F 3/14* (2013.01); *G06T 11/00* (2013.01); *H04N 5/272* (2013.01); *G06T 2207/10016* (2013.01); *G06T 2207/30196* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| | | |
|---|---|---|
| 2007/0248244 A1 | 10/2007 | Sato et al. |
| 2008/0304706 A1 | 12/2008 | Akisada et al. |
| 2009/0002489 A1 | 1/2009 | Yang et al. |
| 2011/0199461 A1 | 8/2011 | Horio et al. |

(Continued)

FOREIGN PATENT DOCUMENTS

| | | |
|---|---|---|
| CN | 201315654 Y | 9/2009 |
| CN | 105759720 S | 7/2016 |

(Continued)

OTHER PUBLICATIONS

International Search Report for PCT Application No. PCT/JP2018/006229, dated May 1, 2018.

(Continued)

*Primary Examiner* — Yi Wang
(74) *Attorney, Agent, or Firm* — Sughrue Mion, PLLC

(57) ABSTRACT

A video image processing device comprises at least one memory configured to store instructions and, at least one processor configured to execute the instructions. The at least one processor controls to display a trajectory indicating a change in a position of an object in a video image. The at least one processor controls to display an image of the object corresponding to a vicinity of the trajectory in the video image around a part of the trajectory.

8 Claims, 23 Drawing Sheets

(56) References Cited

U.S. PATENT DOCUMENTS

| | | | |
|---|---|---|---|
| 2012/0062732 A1* | 3/2012 | Marman | G08B 13/19682 348/142 |
| 2014/0101169 A1* | 4/2014 | Kurata | G06F 3/14 707/748 |
| 2015/0016671 A1* | 1/2015 | Adachi | G06T 7/254 382/103 |
| 2015/0023562 A1* | 1/2015 | Moshfeghi | G01S 5/0263 382/106 |
| 2015/0117835 A1 | 4/2015 | Yabuuchi | |
| 2015/0356840 A1 | 12/2015 | Wang et al. | |

FOREIGN PATENT DOCUMENTS

| | | |
|---|---|---|
| GB | 2482067 A | 1/2012 |
| JP | H05-94536 A | 4/1993 |
| JP | 2000-099851 A | 4/2000 |
| JP | 2006-093955 A | 4/2006 |
| JP | 2006-350761 A | 12/2006 |
| JP | 2007-280043 A | 10/2007 |
| JP | 2008-306604 A | 12/2008 |
| JP | 2009-015827 A | 1/2009 |
| JP | 2009-225398 A | 10/2009 |
| JP | 2010-123069 A | 6/2010 |
| JP | 2011-254289 A | 12/2011 |
| JP | 2012-133666 A | 7/2012 |
| JP | 2014-153813 A | 8/2014 |
| JP | 2015-018340 A | 1/2015 |
| JP | 2015-089019 A | 5/2015 |
| JP | 2016-129306 A | 7/2016 |
| JP | 2016-225813 A | 12/2016 |
| WO | 2016/002152 A1 | 1/2016 |

OTHER PUBLICATIONS

Extended European Search Report for EP Application No. EP18777924.4 dated Jan. 24, 2020.
Chinese Office Action for CN Application No. 201880023062.0 dated Jul. 16, 2020 with English Translation.
Japanese Office Action far JP Application No. 2020-105351 dated Jun. 29, 2021 with English Translation.
JP Office Action for JP Application No. 2021-132505, dated Aug. 30, 2022 with English Translation.
JP Office Action for JP Application No. 2021-132505, mailed on Feb. 7, 2023 with English Translation.
JP Office Action for JP Application No. 2021-132505, dated Apr. 11, 2023 with English Translation.

* cited by examiner

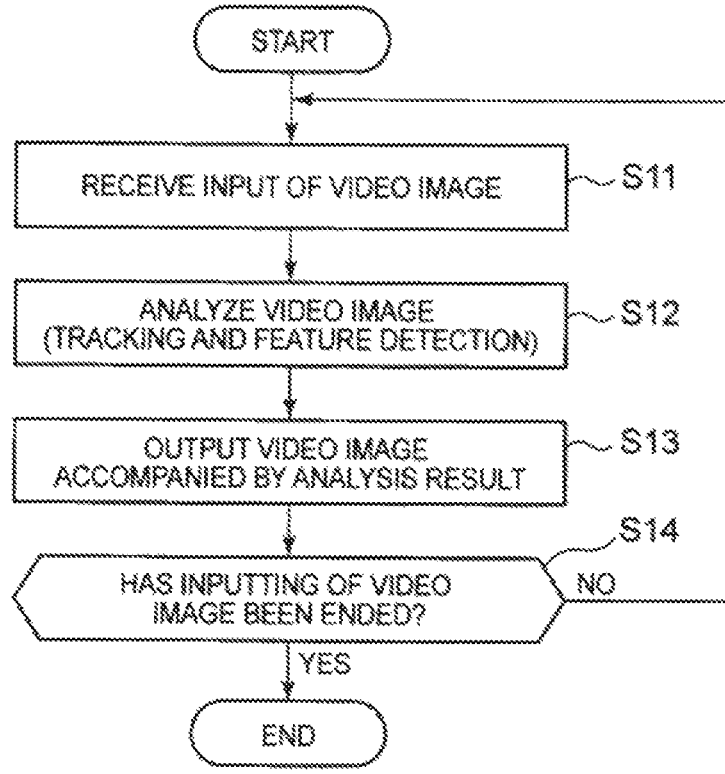
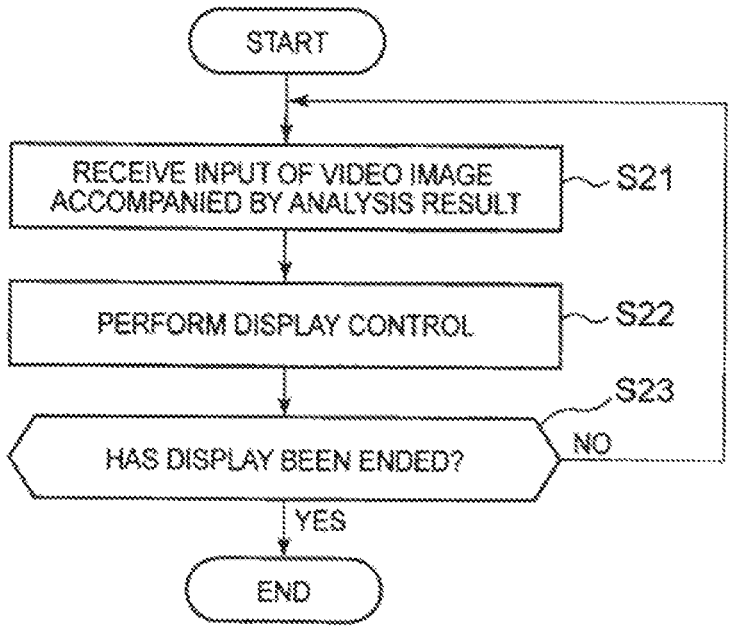

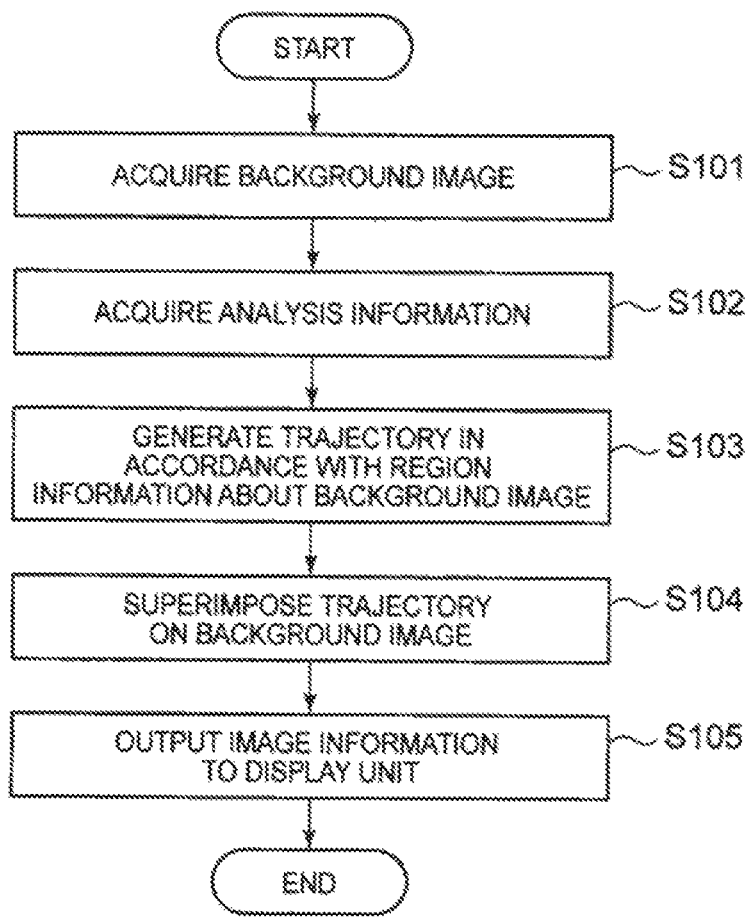

FIG. 28
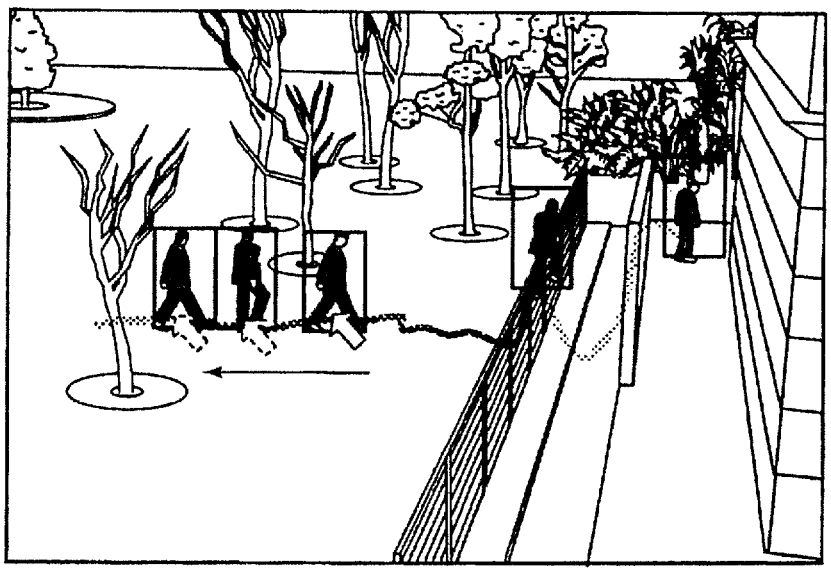
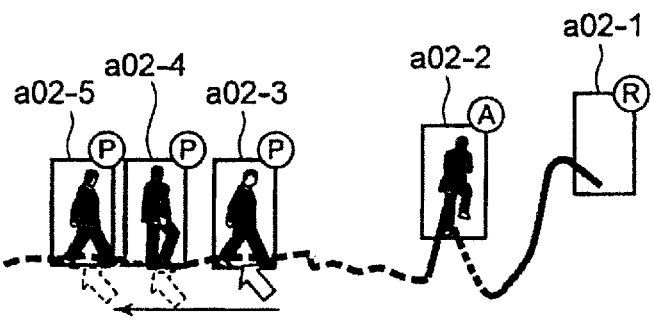

FIG. 29
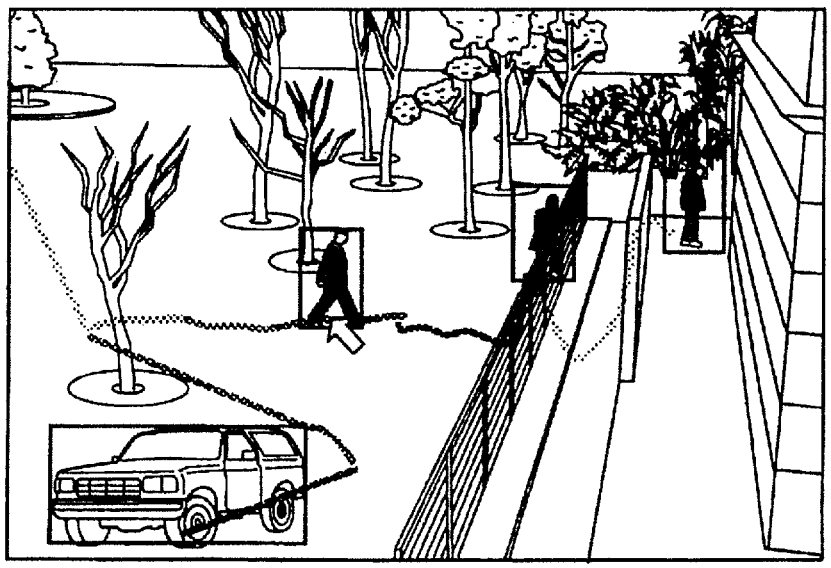
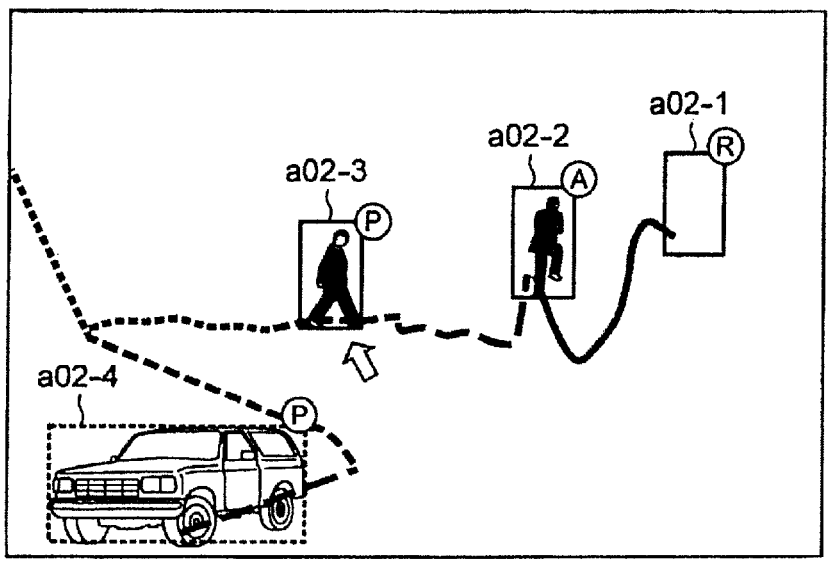

VIDEO IMAGE PROCESSING DEVICE, VIDEO IMAGE ANALYSIS SYSTEM, METHOD, AND PROGRAM

The present application is a divisional application of U.S. patent application Ser. No. 16/489,374 filed on Aug. 28, 2019, which is a National Stage Entry of international application PCT/JP2018/006229, filed Feb. 21, 2018, which claims the benefit of priority from Japanese Patent Application 2017-070677 filed on Mar. 31, 2017, the disclosures of all of which are incorporated in their entirety by reference herein.

TECHNICAL FIELD

The present invention relates to a video image processing device, a video image processing method, and a video image processing program for processing video images. The present invention also relates to a video image analysis system for analyzing video images.

BACKGROUND ART

For example, there is a video image analysis technique for analyzing a video image obtained from a camera device with a computer, and issuing an alert. For example, there is a video image analysis technique for detecting a position or a motion of an object from a video image, and generating an alert when the detection result satisfies a predetermined condition. Such a video image analysis technique is utilized at a control center where an operator is present, for example, to check a video image based on which an alert has been issued, and taking appropriate measures in accordance with the issued alert.

In such a case, the operation to check the video image based on which the alert has been issued is normally performed while the current video image is being monitored at the control center. When an alert is issued, an operator checks the past video images, to determine whether the alert is a false alert. If the alert is not a false alert, the operator acquires necessary information, and takes measures such as sending the information as an appropriate alert to a predetermined address, for example. In doing so, the operator selects, from the past video images, information from which a check can be made to determine whether the alarm is a false alarm, and, if the alert is not a false alarm, the operator acquires features of an intruder as the target in the alert, a dangerous moving object, or the like (any of these will be hereinafter referred to as an object).

Regarding such video image monitoring, Patent Literatures 1 to 3 disclose example techniques.

For example, Patent Literature 1 discloses that, on the display screen of a display device that displays a moving image, the trajectory of movement of an object is superimposed and displayed on images sequentially obtained from the imaging device that is the source of the moving image. Patent Literature 1 also discloses that designation of the movement trajectory being displayed is received from a user, the movement trajectory is displayed in a different display mode from that for the other movement trajectories, and an object detection region is set so that the movement trajectory does not intersect with any other movement trajectory.

Patent Literature 2 discloses an example in which different persons and a trajectory of one vehicle are shown in a video image.

In Patent Literature 3, displaying a composite image obtained by combining frame images is disclosed as a method of determining a behavior from displacement of a part. Patent Literature 3 also discloses an example of combining images by superimposing consecutive frames on one another, and an example of indicating a moving image and a movement trajectory of a target part with dots and arrows in a composite image.

CITATION LIST

Patent Literatures

[Patent Literature 1] Japanese Patent Application Laid-Open No. 2015-018340
[Patent Literature 2] Japanese Patent Application Laid-Open No. 2009-015827
[Patent Literature 3] Japanese Patent Application Laid-Open No. 2012-133666

SUMMARY OF INVENTION

Technical Problem

In the fields of surveillance, there is a demand for display that enables an operator to quickly gather the features of an object from past images while monitoring the current video image after an alert is issued, and there also is a demand for an interface for the display. By the method disclosed in Patent Literature 1, however, a movement trajectory is always simply superimposed on the current image. While it is possible to observe the movement path of an object, it is not possible to know the recent and current behaviors of an object shown only in past video images, the situations in the surrounding area, changes in features, and the like. Therefore, to collect such information, an operator has to switch screens or check past video images on another window. This results in the problem of time costs and the risk of oversight.

The problems with the method disclosed in Patent Literature 2 are basically the same as those with Patent Literature 1. That is, by the method disclosed in Patent Literature 2, a movement trajectory is always simply superimposed on the current image. While it is possible to observe the movement paths of objects, it is not possible to know the recent and current behaviors of an object shown only in past video images, the situations in the surrounding area, changes in features, and the like.

By the method disclosed in Patent Literature 3, consecutive frames are superimposed on one another, so that the states of the object or a part of the object in the past can be checked. However, even if this method is simply applied to a surveillance video image, the image currently being displayed becomes complicated, and it is difficult to obtain the necessary information.

For example, in a case where consecutive frames in a video image are simply superimposed on one another, the objects in the respective frames overlap one another, and the necessary information cannot be obtained.

The problem of time costs and the risk of oversight described above might be caused not only in a site of surveillance of a real-time video image accompanied by an alert, but also in a scene where the images at two or more points of time in a video image need to be quickly checked.

The present invention has been made in view of the above problems, and aims to provide a video image processing device, a video image analysis system, a video image processing method, and a video image processing program that enable a user to quickly grasp the situations of an object at two or more points of time in a video image.

Solution to Problem

A video image processing device according to the present invention characteristically includes a display control means that causes a display unit to display a trajectory indicating a change in a position of an object in a video image, wherein the display control means acquires a first request designating a point in the trajectory being displayed, and displays a designated image including the object which it was located at the designated point by superimposing it on an arbitrary background image being displayed on the display unit.

A video image analysis system according to the present invention characteristically includes: a tracking means that analyzes a video image, and continuously acquires a position of a tracking target object from the video image; a storage means that stores position information indicating the position acquired by the tracking means in association with identification information about an image from which the position was acquired in the video image; and a display control means that causes a display unit to display a trajectory indicating a change in the position of the object in the video image, based on the information stored in the storage means, wherein the display control means acquires a first request designating a point in the trajectory being displayed, and displays a designated image including the object which it was located at the designated point by superimposing it on an arbitrary background image being displayed on the display unit.

A video image processing method according to the present invention characteristically includes: causing a display unit to display a trajectory indicating a change in a position of an object in a video image; acquiring a first request designating a point in the trajectory being displayed; and displaying a designated image including the object which it was located at the designated point by superimposing it on an arbitrary background image being displayed on the display unit.

A video image processing program according to the present invention characteristically causes a computer to: perform a process of causing a display unit to display a trajectory indicating a change in a position of an object in a video image; in the process, acquire a first request designating a point in the trajectory being displayed; and display a designated image including the object which it was located at the designated point by superimposing it on an arbitrary background image being displayed on the display unit.

Advantageous Effects of Invention

According to the present invention, a user can quickly grasp the situations of an object at two or more points of time in a video image.

BRIEF DESCRIPTION OF DRAWINGS

FIG. 8 is a flowchart showing an example operation of a video image analysis device 2 of the first embodiment.

FIG. 9 is a flowchart showing an example operation of a video image processing device 4 of the first embodiment.

FIG. 10 is a flowchart showing an example of display control in a display control unit 105.

FIG. 28 is an explanatory view showing an example of a display image and an example of a superimposed image at the time of the display image.

FIG. 29 is an explanatory view showing an example of a display image and an example of a superimposed image at the time of the display image.

DESCRIPTION OF EMBODIMENTS

Exemplary Embodiment 1

The following is a description of embodiments of the present invention, with reference to the drawings. In each of the embodiments described below, an example case where the present invention is applied to video image monitoring for fault detection will be described, but the present invention is not limited to use in video image monitoring for fault detection.

Figure 1:
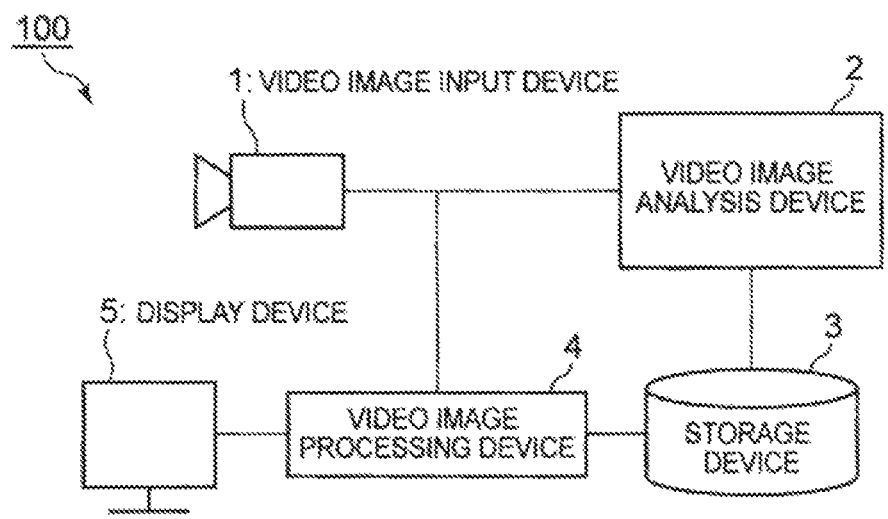
FIG. 1 is a diagram schematically showing the configuration of a video image analysis system of a first embodiment.

FIG. 1 is a diagram schematically showing the configuration of a video image analysis system of a first embodiment. As shown in FIG. 1, the video image analysis system 100 includes a video image input device 1, a video image analysis device 2, a storage device 3, a video image processing device 4, and a display device 5.

The video image input device 1 inputs an image to be analyzed. The video image input device 1 is formed with an imaging device capable of capturing a moving image, for example. Although only one video image input device 1 is shown in FIG. 1, but more than one video image input device 1 may be used.

In general, a "video image" means a moving image formed with frame images corresponding to respective consecutive frames. However, in the present invention, a "video image" may not be a so-called moving image, but may be a still image group including two or more still images accompanied by information about the imaging times and the imaging regions, a moving image or a composite image group formed with still images included in the above described still image group, or the like. Also, in the description below, an image in a video image may not be a so-called frame image in a moving image, but may be an image included in the above mentioned "video image". Further, in the description below, an image at a certain time point in a video image may not be the frame image at the time point in a so-called moving image, but may be the image of the time corresponding to the time point on a predetermined time axis included in the above mentioned "video image".

The video image analysis device 2 analyzes a video image that has been input thereto (this video image will be hereinafter referred to as the "input video image"), stores the analysis result into the storage device 3, and outputs a warning or any other message as necessary.

The video image analysis device 2 analyzes the input video image, detects and tracks a predetermined object such as a moving object appearing in the input video image, and continuously acquires the position of the object from the input video image. For example, the video image analysis device 2 may acquire the position of the object at each time point in the input video image. The video image analysis device 2 also generates analysis information in which position information indicating the acquired position of the object is associated with identification information about the image of the time when the position was acquired. Hereinafter, the object to be tracked will be also referred to as the "tracking target object" in some cases.

The video image analysis device 2 also analyzes the input video image, and may further detect a correspondence time which is the time point of the image in the input video image from which the position of the tracking target object has been acquired, the features of the tracking target object in the image in the input video image at the time point, the presence or absence of another object related to the tracking target object, and the features thereof if there is such an object.

Examples of the features of an object (which may be the tracking target object or another related object) are the states of the object such as the direction, the size, and operation of the object or a predetermined part thereof, changes in the features of the object in the input video image, such as the states, the clothes, and the possessions, other matters related to the object and another related object (such as the presence/absence of another object, and the classification thereof), and the like.

The video image analysis device 2 may also output a predetermined message, in accordance with analysis results including those items detected from the input video image. The video image analysis device 2 may determine whether the position of the object and the other items detected from the input video image satisfy a predetermined condition, for example. If the video image analysis device 2 determines that the predetermined condition is satisfied, the video image analysis device 2 may output the predetermined message. The video image analysis device 2 may output the predetermined message to a predetermined display device, a user terminal, or a predetermined terminal in the control center, for example.

The storage device 3 stores the input video image and information indicating the results of the video image analysis conducted by the video image analysis device 2. The storage device 3 may store not only the input video image but also, for each tracking target object, analysis information that associates information indicating analysis results including the position acquired from the input video image and other detected items, with information (such as identification information) indicating the image from which the position has been acquired in the input video image, for example.

It should be noted that the storage device 3 does not necessarily store all of the input video image. For example, in the case where the input video image is a streaming video that is sequentially input like a real-time video image or where the video image size (data capacity) is larger than a predetermined threshold, the storage device 3 may store only a predetermined amount of the video image from the latest part of the input video image. Here, a certain number of images, a time length, or a data capacity may be determined as the predetermined amount.

The video image processing device 4 displays, on the display device 5, an image (which may be a moving image and a still image) included at any time point in the input video image, an image generated in accordance with the input video image, or the like. The image generated in accordance with the input video image is not limited to any particular kind. For example, such an image may be a sketch of a predetermined region, or may be a composite image formed with images included at two or more points of time in the input video image. The video image processing device 4 displays an image designated by a user on the display device 5, for example.

The video image processing device 4 has a function of displaying a trajectory indicating changes in the position of the object in the input video image when displaying such an image on the display device 5. The trajectory display method will be described later.

The video image processing device 4 may output image information about the image to be displayed on the display device 5, and cause the display device 5 to display the desired image.

The display device 5 is an image display device that displays an image in accordance with the image information output from the video image processing device 4. The display device 5 is formed with a display or the like. Although only one display device 5 is shown in FIG. 1, more than one display device 5 may be used. In a case where more than one display device 5 is used, the video image processing device 4 superimposes the trajectory on the image being displayed on at least one display device 5 designated to display the trajectory by the user.

Figure 2:
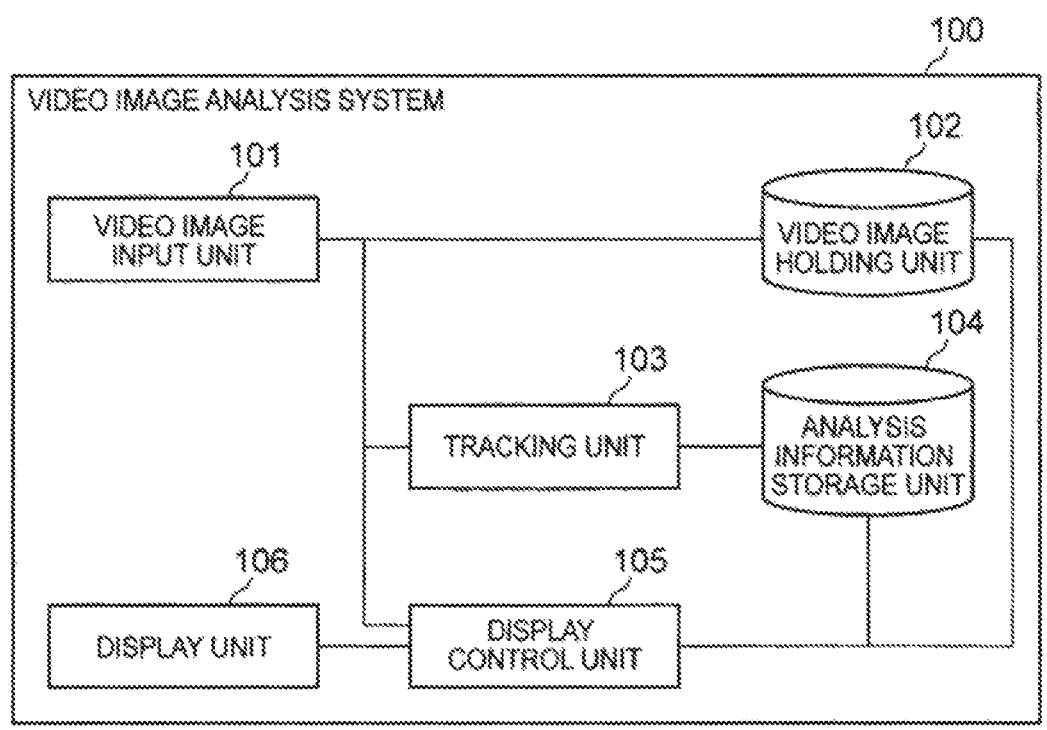
FIG. 2 is a block diagram showing an example configuration of the video image analysis system of the first embodiment.

FIG. 2 is a block diagram showing an example configuration of the video image analysis system of this embodiment. It should be noted that FIG. 2 shows an example configuration of the video image analysis system on the functional aspect. As shown in FIG. 2, the video image analysis system 100 may include a video image input unit 101, a video image holding unit 102, a tracking unit 103, an analysis information storage unit 104, a display control unit 105, and a display unit 106.

Here, the video image input unit 101 corresponds to the video image input device 1. The video image holding unit 102 and the analysis information storage unit 104 correspond to the storage device 3. The tracking unit 103 corresponds to the video image analysis device 2. The display control unit 105 corresponds to the video image processing device 4. The display unit 106 corresponds to the display device 5.

In the example shown in FIG. 2, the tracking unit 103 is formed with an information processing device such as a CPU included in the video image analysis device 2, for example. The display control unit 105 is formed with an information processing device such as a CPU included in the video image processing device 4. Although the video image analysis device 2 and the video image processing device 4 are shown as separate devices in FIG. 1, these devices may be formed with one device.

The video image input unit 101 inputs a video image.

The video image holding unit 102 stores the input video image. It should be noted that the video image holding unit 102 may store only a predetermined amount of the video image from the latest image in the input video image.

The tracking unit 103 analyzes the input video image, and continuously acquires the position of the tracking target object from the input video image. The method of tracking the tracking target object with the tracking unit 103 is not limited to any particular method.

When acquiring the position, the tracking unit 103 further detects the time (the corresponding time) corresponding to the time when the position was acquired, the features of the tracking target object or the features of another object related to the tracking target object in the image at the time point in the input video image.

The tracking unit 103 then stores analysis information into the analysis information storage unit 104. In the analysis information, information indicating analysis results including the position acquired from the input video image and the items detected together with the position is associated with identification information about the image from which the position was acquired in the input video image. Here, the identification information is not limited to any particular information, as long as it can identify the image in the input video image. For example, the identification information may be information indicating a time point of the image in the input video image, or an identifier attached to the image in the video image.

Further, the tracking unit 103 may have a function of outputting a predetermined message in accordance with the analysis results or other information.

The tracking unit 103 may output a message indicating an alert, in accordance with sensor information that is input from a predetermined sensor such as an infrared sensor, a pressure sensor, or a vibration sensor. In a case where an object is detected from the input video image (an object other than the background is seen in the video image) as a result of analysis of the input video image, the tracking unit 103 may output a message to that effect. In a case where a predetermined object (such as a human being or a specific person Y) is detected from the input video image as a result of analysis of the input video image, the tracking unit 103 may output a message to that effect. In a case where a moving object crossing over a predetermined intrusion detection line is detected, or where a moving object entering a predetermined region or an object being left behind in or taken away from the predetermined region, for example, the tracking unit 103 may output a message to that effect.

Figure 3:
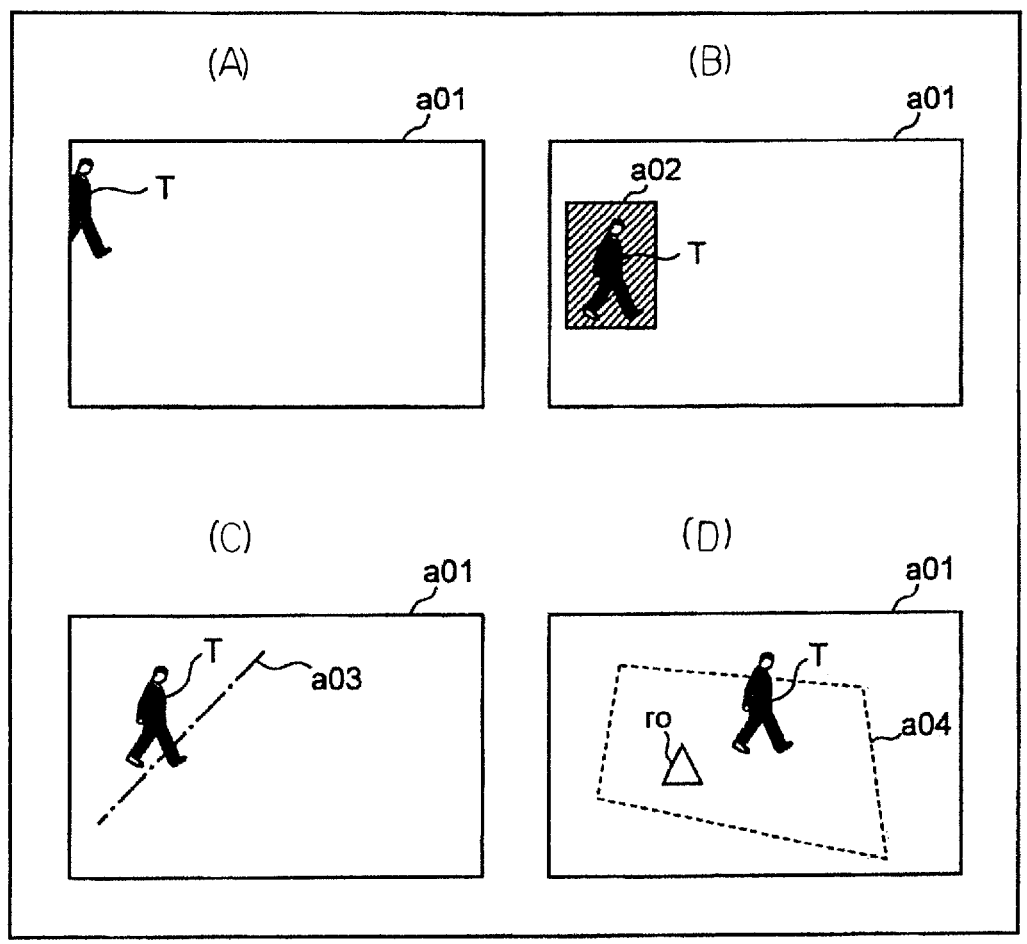
FIG. 3 is an explanatory diagram showing an example of detection in a tracking unit 103.

FIG. 3 items (A) to (D) are explanatory diagrams showing examples of detection in the tracking unit 103. The example shown in item (A) of FIG. 3 is an example in which an object (a moving object) is detected from an image region a01 of an input video image. It should be noted that sign T represents the object regarded as the tracking target object. The example shown in item (B) of FIG. 3 is an example in which a predetermined object is detected from the image region a01 of the input video image. It should be noted that sign a02 represents an object region that is the region of the object detected from the image in the input video image. The example shown in item (C) of FIG. 3 is an example in which an object crossing over an intrusion detection line a03 in the image region a01 of the input video image is detected. Further, the example shown in item (D) of FIG. 3 is an example in which an object being left behind in a predetermined monitoring region a04 of the image region a01 of the input video image is detected. Here, the object being left behind is detected as a related object ro that is another object related to the tracking target object T.

The tracking unit 103 may store the information indicating the position acquired as a result of tracking separately from the other information. For each tracking target object, the tracking unit 103 may store, into the analysis information storage unit 104, information that associates the information indicating the position with the identification information about the image in the input video image, separately from information that associates the information indicating the detected items other than the position with the identification information about the image in the input video image. In this embodiment, a combination of these kinds of information even in such a case is referred to as "analysis information".

The display control unit 105 causes the display unit 106 to display a trajectory indicating changes in the position of the object in the video image. For example, when displaying an image at some time point included in the input video image or a predetermined image generated in accordance with the input video image, the display control unit 105 sets the image as the background image, and superimposes the trajectory of the predetermined object in the input video image on the background image. It should be noted that the background image is not limited to any particular kind of image, as long as it includes a region corresponding to at least a part of the moving path of the object in the image region.

Further, in accordance with the information stored in the analysis information storage unit 104, the display control unit 105 of this embodiment adds a notification function of notifying the user of the results of the analysis of the input video image and the time elapsed since a predetermined time, to the trajectory in the input video image of the object.

For example, the display control unit 105 may make the display mode of a part of the trajectory differ from another part, or add information indicating the analysis results or the elapsed time in the vicinity of a part of the trajectory, in accordance with the features of the object or the features of another object related to the object shown in the analysis result obtained by analyzing the input video image. Alternatively, the display control unit 105 may make the display mode of a part of the trajectory differ from another part, or add information indicating the elapsed time in the vicinity of a part of the trajectory, in accordance with the elapsed time from the predetermined time, for example.

The analysis results are not limited to any particular results, as long as they are items obtained as a result of analyzing the input video image. The analysis results may be the object-related items obtained as a result of tracking the object shown in the input video image (the items may be the features of the object or the features of another object related to the object), for example. Examples of such items include the state of the object, changes in the features of the object, the presence or absence of another object related to the object, and information amount such a related object, as described above. The state of the object may be the direction, the size, movement (motions or behaviors), and the like of the entire object or a predetermined part of the object.

An example of another object related to the object is an object that draws a trajectory having a predetermined relationship with the trajectory of the object in the input video image. It should be noted that the above described "being left behind" and "being take away", and the later described "interaction" are examples of the predetermined relationship.

Also, the corresponding position in the trajectory accompanied by information may be the position in the trajectory corresponding to the time point when an item to be displayed was detected, for example. In a case where the time elapsed since the predetermined time is to be displayed, the corresponding position in the trajectory is the position in the trajectory corresponding to the time when the elapsed time passed since the predetermined time The display control unit 105 may set the "vicinity" that is a predetermined pixel range from the corresponding position in the trajectory, for example.

The predetermined time may be the latest time in the input video image or the time when the predetermined message is sent from the predetermined system that analyzes the input video image.

Further, in a case where a point or a section designated by a user or a point or a section satisfying a predetermined condition as a result of analysis, is included in the trajectory, the display control unit 105 may display the trajectory in such a form that the point or the section can be recognized, when superimposing the trajectory.

For example, the display control unit 105 may make the display mode of a part (such as the point or the section) of the trajectory differ from another part, or add information indicating the analysis results or the elapsed time in the vicinity of a part of the trajectory (such the point or the section).

Hereinafter, such a point that satisfies a condition may be referred to as a condition point. Likewise, such a section satisfying a condition may be referred to as a condition section.

The condition point or the condition section may be a point or a section where the direction, the size, or movement of the object or a predetermined part thereof satisfies a predetermined condition, or a point or a section where changes in the features of the object satisfy a predetermined condition, for example.

Further, in a case where the trajectory includes a roaming section in which the object is determined to be roaming according to the analysis results, for example, the display control unit 105 may shorten the subject section, and then display the section in a different display mode from the other sections. It should be noted that the roaming section is also an example of a condition section.

The display control unit 105 may determine whether a section in the trajectory is a roaming section, in accordance with the roughness ratio of a trajectory that is the trajectory of sections of respective time unites in the trajectory of the object or the trajectory of one or more sections that follows the time unit sections and has a predetermined thickness, to the extensional rectangle surrounding the trajectory. The method of determining a roaming section is not limited to the above described method. For example, a roaming section may be determined depending on whether the current position is located in a region based on the past position within the set time or whether the change in the position at each set time is equal to or smaller than a predetermined distance.

For example, in a case where a roaming section is included in the trajectory, and the roaming section is shortened for display, the display control unit 105 acquires a predetermined request designating the shortened and displayed section. The display control unit 105 may then restore the section to the original state and display the original section, or display an alternative display including the points corresponding to the points included in the original section in the designated section.

The display control unit 105 may display a line or a slide bar as the above mentioned alternative display. The line or the slide bar corresponds to the section prior to the shortening in the display region of the display unit 106 as the above alternative display. At this stage, it is preferable to make the line segment the same display target as the subject section or attach the same information to the line segment.

Further, in a case where the input video image is a streaming video image to be sequentially input, for example, the display control unit 105 may set one of an image at some time point in the input video image and a predetermined image generated based on the input video image as a background image, and display a trajectory superimposed on the background image. With this arrangement, the user can constantly recognize the latest elapsed time and the state of the object.

At this stage, even if the background image is an image at a past time point included in the input video image, for example, the display control unit 105 can superimpose, on the background image, a trajectory in the display mode corresponding to the results of the latest analysis of the object detected from the input video image, or a trajectory in the display mode corresponding to the latest time elapsed since the predetermined time. With this arrangement, while checking the background image as a past image, the user can recognize the latest situation by checking a trajectory including the latest position of the object displayed together with the image, the latest features and the like of the object, and a trajectory that has a display mode or accompanying information varying with the elapsed time.

In this embodiment, a trajectory that has a display mode or accompanying information varying with the above described analysis results or the time elapsed since the predetermined time is also called a tracking line.

For example, the display control unit 105 can display the following information (features), using the tracking line.

The traveling direction of the object (which is the tracking line)

The time elapsed since the predetermined time

The direction of the face of the object

The staying time at the corresponding point (using display of the elapsed time and display of the above point or the section)

Features such as the color or the pattern of the outfit of the object

A motion of the object (such as crouching, standing up, walking, running (speed), or jumping)

An interaction with another object (such as crossing, joining, or branching)

To whom the tracking line belongs

Examples of interactions with another object include an interaction between persons and an interaction with another object (such as a vehicle). Here, the presence or absence of an interaction may be determined depending on whether there is a point or section located in a range close to the trajectory of another object in terms of time and distance in the trajectory of the object. In a case where the trajectory of the other object moves away after an interaction like a conversation between persons, the interaction may be displayed as "crossing". In a case where two or more trajectories are combined into one by an interaction like persons riding a vehicle, the interaction may be displayed as "joining". In a case where two or more trajectories are derived from one trajectory by an interaction like persons getting off a vehicle, the interaction may be displayed as "branching".

Using the object whose trajectory is to be displayed and using the trajectory, the display control unit 105 may narrow down object(s) to display the trajectory, display item(s) to be displayed on the display unit 106 using the trajectory, and range of the trajectory to be displayed, based on user's designation, a reference time or a reference timing for the elapsed time, the time elapsed from the reference, a direction of the object, staying time of the object, a color of an outfit of the object, a pattern of an outfit of the object, and a progressing direction of the object, for example.

The display control unit 105 can also display the trajectories of two or more objects in one background image. For example, the display control unit 105 may display an interaction with another object related to the object by displaying the trajectory of the object.

The display mode in a trajectory can be varied by changing colors, line types (including the shapes of dotted lines and the like), spacing (including spacing between the dots and spacing between lines in dotted lines), line thicknesses, the shapes of elements such as the parts corresponding to the lines in dotted lines or markers, or the directions of the markers or directional signs, for example. It should be noted that these items can be used in combination.

Here, the markers may be marks indicating the spacing between the spots or the sections included in a line segment, or marks, figures, or some other signs that represent regular items that always exist in the trajectory. Symbols are any appropriate characters, marks, figures, and other signs that are provided only when a specific condition is satisfied. Alternatively, the display control unit 105 may vary display modes in a trajectory by changing the display method (narrowed display) when narrowing down predetermined sections in the trajectory.

Figure 4:
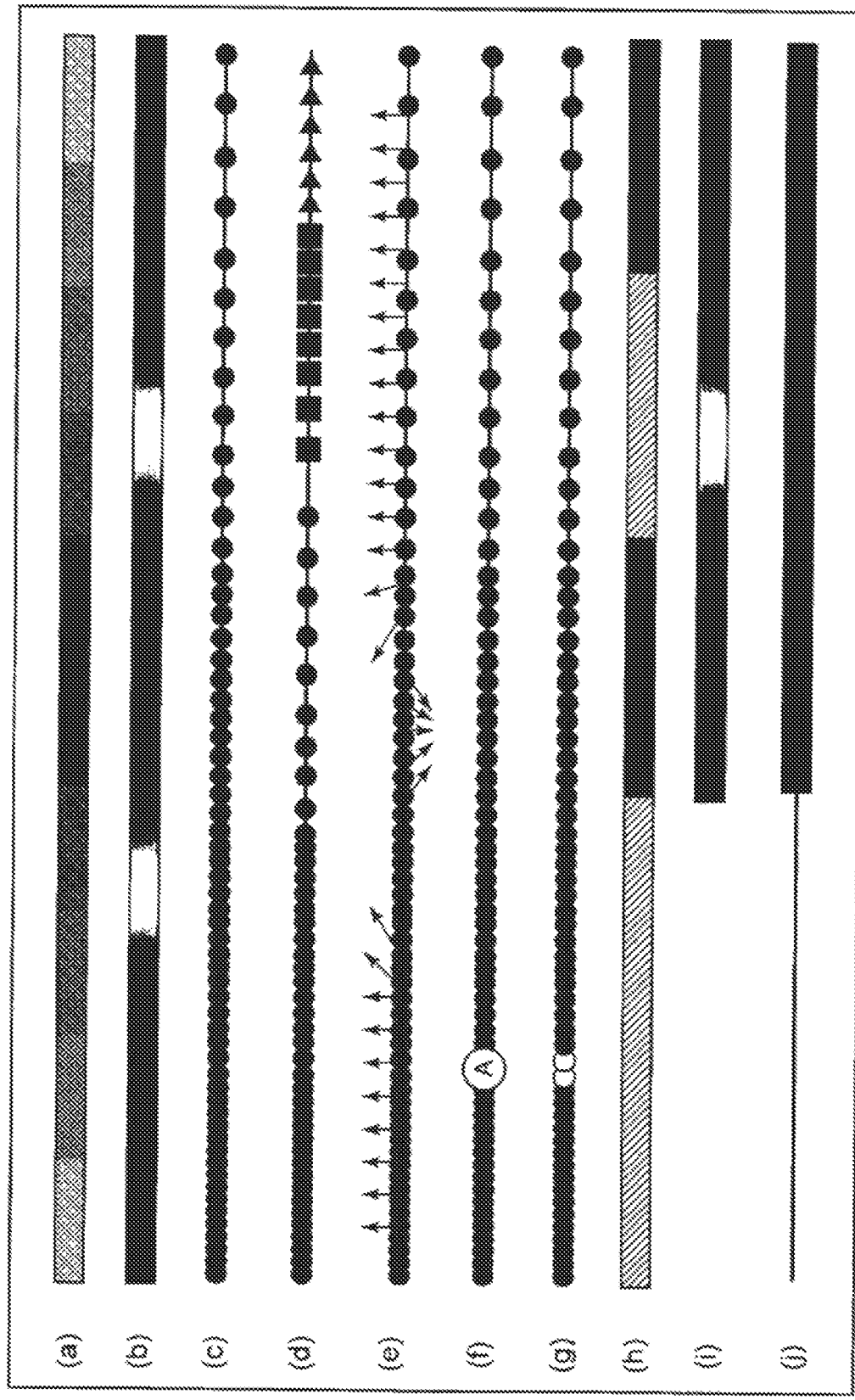
FIG. 4 is an explanatory diagram showing an example expression of a trajectory.

FIGS. 4(a) to 4(j) are explanatory diagrams each showing an example expression of a trajectory (tracking line). FIG. 4(a) shows an example in which color density is varied in trajectory. FIG. 4(b) shows an example in which color is varied in a trajectory. In FIG. 4(b), differences in color are represented by shades of the line. FIG. 4(c) shows an example in which marker intervals are varied in a trajectory. FIG. 4(d) shows an example in which the shapes of markers are varied in a trajectory. FIG. 4(e) shows an example in which the directions of directional signs attached in a trajectory are varied. The directional signs are associated with directions of the object, for example. Although arrows are shown as an example of the directional signs in FIG. 4(e), the directional signs may be simple lines without any marks at their tops, or may have some other shapes such as triangular shapes. FIG. 4(f) shows an example in which symbols indicating specific information are attached to the corresponding points. FIG. 4(g) shows an example in which display modes are varied as specific markers are made to flicker.

FIG. 4(h) shows an example of narrowed display of sections, and an example in which the range other than a specific range is grayed out. FIG. 4(i) shows another example of narrowed display of sections, and an example in which the range other than a specific range (such as a section within a specific time period) is erased. FIG. 4(j) shows another example of narrowed display of sections, and an example in which the thickness of the tracking line is varied between the current section and the other sections. For narrowed display, it is preferable to vary display modes by using a different method from the method used to vary display modes in a specific range.

Figure 5:
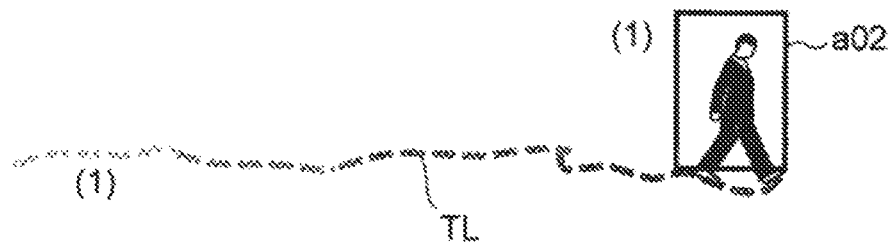
FIG. 5 is an explanatory diagram showing an example of correspondence between a tracking line and an object.

FIG. 5 is an explanatory view showing an example of correspondence between a tracking line and an object. As shown in FIG. 5, the display control unit 105 may associate a tracking line with an object by assigning the same number or the like to the tracking line and the object. In the drawing, sign TL represents the tracking line. The tracking line TL in the drawing is colored in accordance with the state of the object. However, in FIG. 5, the different colors are indicated by shades of the line.

In a case where one image includes more than one tracking target person, and images of a certain object at different points of time are displayed at the same time, the display control unit 105 may indicate the identity of the object by assigning the same number or the like to the vicinities of object regions of the object, or surrounding the object regions of the object with frames in the same color or lines of the same type.

Figure 6:
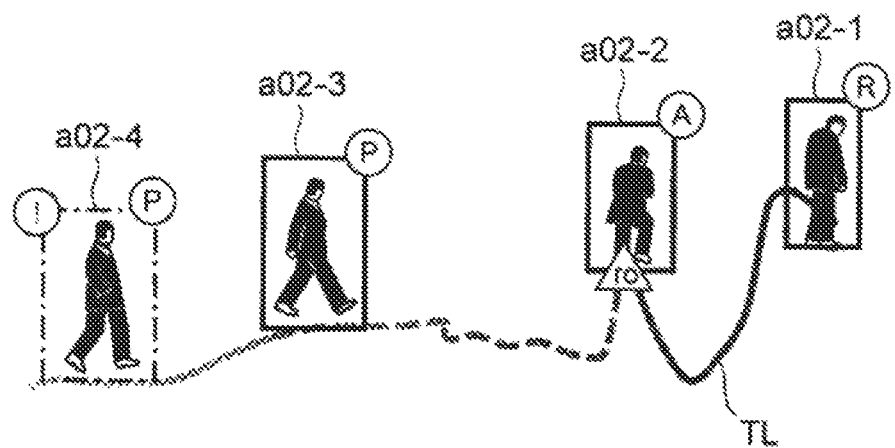
FIG. 6 is an explanatory diagram showing an example of attaching information to a tracking line.
Figure 7:
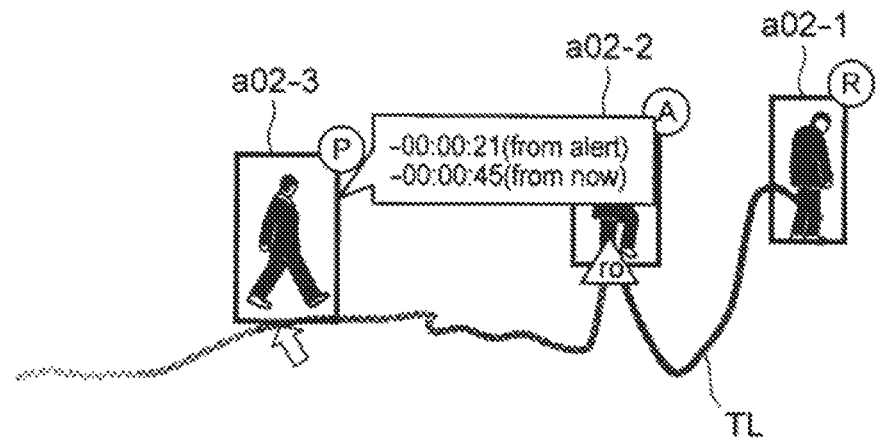
FIG. 7 is an explanatory diagram showing an example of attaching information to a tracking line.

FIGS. 6 and 7 are explanatory diagrams showing examples in which information is attached to a tracking line. FIG. 6 shows an example of accompanying information to be attached to a trajectory in a case where images of a certain object at different points of time in the trajectory are simultaneously displayed. It should be noted that images of the object at the other points of time other than the background image are also included in the accompanying information.

For example, FIG. 6 shows an example in which the line type of the frame surrounding the object region a02 of the object is varied, and symbols are added to the frames on display. In the example shown in FIG. 6, the frames of object regions a02-1 to a02-3 are indicated by solid lines in accordance with a change in the features of the object (the presence or absence of a coat), and the frame of an object region a02-4 Is indicated by a dot-and-dash line.

In this manner, the line types of frames may be varied depending on the state of the object. FIG. 6 also shows an example in which an image obtained by cutting out the object region of the object included in the image at the time point corresponding to the time when an alert was issued (an alerting time point) in the input video image is further superimposed, and a symbol (the circled A in the drawing) to that effect is attached to the frame line of the object region a02-2. The circled R in the drawing is an example of a symbol attached at the time point corresponding to the current time, and the circle P in the drawing is an example of a symbol attached to the time point corresponding to a past time. In this manner, the "vicinity" of a certain time point in the trajectory also includes the vicinity of the object region a02 of the object displayed in accordance with the point. The information to be attached also includes a clipped image (hereinafter referred to as an object image) of the object region of the object included in the image generated when the object is located at the point within the trajectory.

Also, the exclamation mark in the drawing is an example of a symbol indicating that a feature has changed. The "ro" mark in the drawing is an example of a symbol indicating that there is an interaction with another object. In a case where the object is not accompanied with any object image, similar symbols may be attached near the corresponding points on the tracking line.

Further, as shown in FIG. 7, the display control unit 105 may attach the information about the object at the time point corresponding to a certain point such as a point designated by the user in the trajectory, or the information about the elapsed time at the time point corresponding to the certain point. Other than that, the display control unit 105 may express the corresponding time with color or accompanying information, by varying the colors of the frame lines at the alerting time point, some other past time point, and the current time point, for example.

Further, the display control unit 105 may allow the user to designate the target to display the trajectory, the display items, and the range of the trajectory, from the elapsed time and the analysis results. For example, a graphical user interface (GUI) capable of designating the items listed below may be prepared so that the user can narrow down the object to display the trajectory, the display items, the range of the trajectory, and the like.

Examples of Targets to Be Narrowed Down.
The time or the timing set as the reference time for the elapsed time, and the time elapsed since the reference time (Within minutes from the time of alert issuance, for example)
The direction of the object
The Staying time of the object
The color or the pattern of the outfit of the object
The traveling direction of the object The GUI may be a general menu expression such as a combo box, a list, a check box, a radio button, a text input, or time selection.

Next, an operation according to this embodiment is described. FIG. 8 is a flowchart showing an example operation of the video image analysis device 2 (the tracking unit 103) of this embodiment. In the example shown in FIG. 8, a video image to be analyzed is first input from the video image input device 1 (step S11).

The video image analysis device 2 then tracks the tracking target object in the input video image, continuously acquires the position of the tracking target object, and detects a predetermined item about the tracking target object in the image of the corresponding time or of the time when the position was acquired (step S12: a video image analysis process).

The video image analysis device 2 then outputs the video image accompanied by the analysis result (step S13: a video image output with an analysis result). Instead of the above output, the video image analysis device 2 may associate the input video image with information indicating the analysis result, and store the input video image and the information into the storage device 3.

The video image analysis device 2 repeats the above processing in steps S11 to S13 until the video image input is ended (step S14).

FIG. 9 is a flowchart showing an example operation of the video image processing device 4 (the display control unit 105) of this embodiment. In the example shown in FIG. 9, a video image accompanied by an analysis result is first input from the video image analysis device 2 or the like (step S21). The video image processing device 4 may read the input video image and the information indicating the analysis result from a predetermined storage unit, instead of receiving an input of a video image accompanied by an analysis result.

When the video image is input, the video image processing device 4 displays, on the display device 5, the image at a certain time point in the input video image or an image created in accordance with the input video image (step S22: a display control process). The display control process will be described later in detail.

The video image processing device 4 repeats the above processing in steps S21 and S22 until an end of display is detected (step S23).

In the description below, an example of the display control process in step S22 is explained, with the functional block being the main body of the operation. FIG. 10 is a flowchart showing an example of the display control (the above display control process in step S22) in the display control unit 105.

In this example, it is assumed that, prior to step S101, the background image and the object to be displayed are designated by the user or are determined in advance. It is also assumed that an image that can be a background image (such as a predetermined amount of image in the input video image or an image generated from the input video image) is stored in the video image holding unit 102 together with its identifier. Further, it is assumed that the analysis information storage unit 104 stores analysis information in which information indicating the analysis results including the position acquired from the input video image by the tracking unit 103 and the other detected items is associated with identification information about the image from which the position was acquired in the input video image.

In the example shown in FIG. 10, the display control unit 105 first acquires a background image from the video image holding unit 102 (step S101).

The display control unit 105 then acquires the analysis information from the analysis information storage unit 104 (step S102).

The display control unit 105 then generates the object's trajectory suitable for the background image, in accordance with region information about the background image (step S103). Here, the region information is information that associates the coordinates of the background image with the coordinates of the (real) imaging region. In the trajectory generation, a trajectory image in which only the trajectory (tracking line) to be displayed is drawn in the image region corresponding to the background image should be generated. The technique of calculating or drawing the path of a trajectory line suitable for a known background image whose positional relationship between the region in the image and the imaging region in accordance with the position information indicating the continuous positions of the object is a known technique, and therefore, detailed explanation thereof is not made herein.

In step S103, in accordance with the analysis information, the display control unit 105 generates a trajectory accompanied by information attached in the vicinity of the corresponding position in the trajectory. The information indicates whether the display mode in the trajectory varies with the results of the analysis of the input video image or the time elapsed since the predetermined time, or indicates the results of the analysis of the input video image or the elapsed time.

The display control unit 105 then superimposes the generated trajectory on the background image, to generate a display image that is an image for display (step S104).

Lastly, the display control unit 105 outputs the image data of the generated display image to the display unit 106, and causes the display unit 106 to display the display image (step S105).

Next, examples of display images in this embodiment are described.

FIG. 11 to FIG. 17 are explanatory views showing examples of display images. In each of these drawings, (A) is an explanatory view showing an image obtained by converting a display image as a color image into a simplified image, and (B) is an explanatory view showing a simplified superimposed image that is an image other than the background image in the display image. It should be noted that, as the display image is simplified, some parts showed using different colors originally is showed differently by using another method (such as attaching different kinds of lines or marks).

Figure 11:
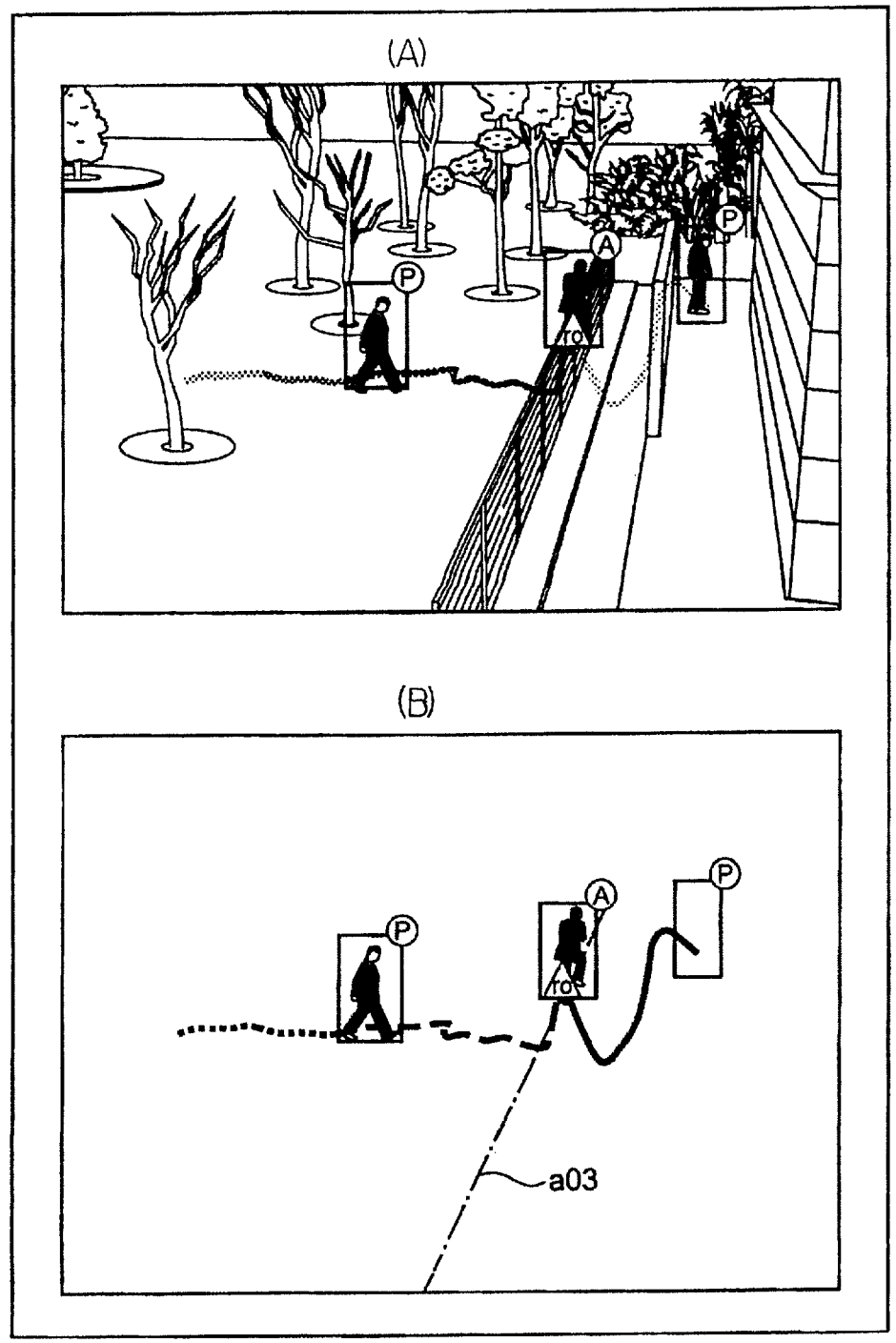
FIG. 11 is an explanatory view showing an example of a display image and an example of a superimposed image at the time of the display image.

The example shown in FIG. 11 is an example of a display image in a case where the latest image is set as the background image, and the background image including the latest object is updated every moment. In FIG. 11, the image of the object corresponding to the latest time is an image of the background image. In item (A) of FIG. 11 the display mode (specifically, the color) of the trajectory is varied with the time elapsed since the latest time, while a symbol (such as circled A, circled P, circled R, or "ro" mark) corresponding to the state of the object at the corresponding time is provided.

In item (B) of FIG. 11, because of the limitations of the drawing, differences in the elapsed time are expressed with line types (spacing between the lines in dotted lines), instead of colors. As shown in FIG. 11, the display control unit 105 may superimpose and display information other than the tracking line, such as the intrusion detection line a03.

Figure 12:
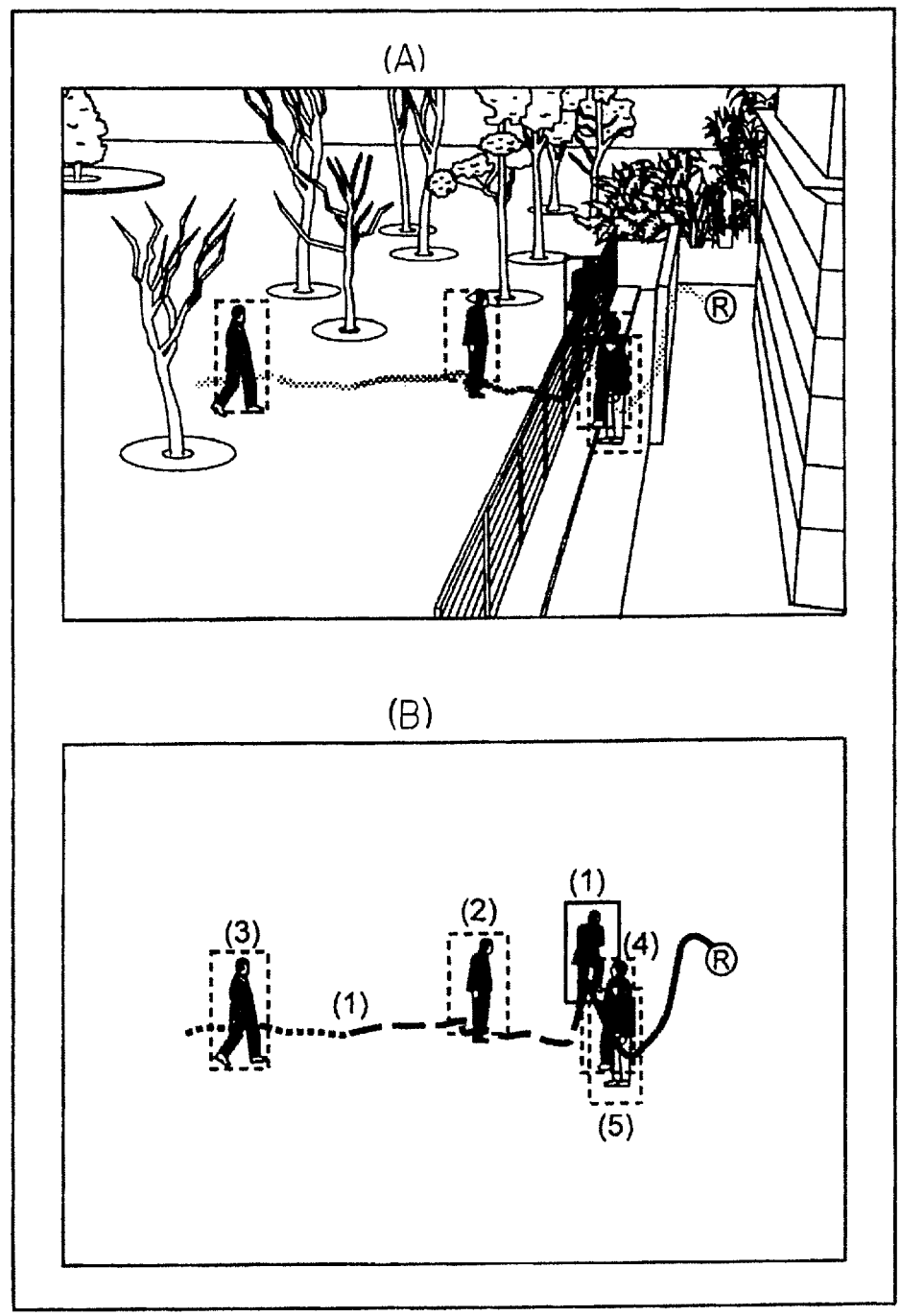
FIG. 12 is an explanatory view showing an example of a display image and an example of a superimposed image at the time of the display image.

The example shown in FIG. 12 is an example of a display image in a case where the image at the alerting time point is set as the background image, and only the tracking line is updated every moment. As shown in FIG. 12, the display control unit 105 may superimpose a trajectory based on the latest position of the object while displaying the latest image as well as a past image. As a result, it becomes possible to observe another tracking target object (another object related to an intruder, for example). In the example shown in item (A) of FIG. 12 the lines surrounding the object regions of the object and another object are different, being a solid line and a dashed line, and the colors of the lines are varied for each object, for example. In item (B) of FIG. 12, instead of colors, numbers for identifying objects are provided.

In the example shown in FIG. 12, the latest object image is not included. However, the display control unit 105 may further perform predetermined processing, such as transparency boosting, on the latest object image (an image cut out from an object region of the object) or the entire latest image, and then superimpose the processed image on the background image.

Figure 13:
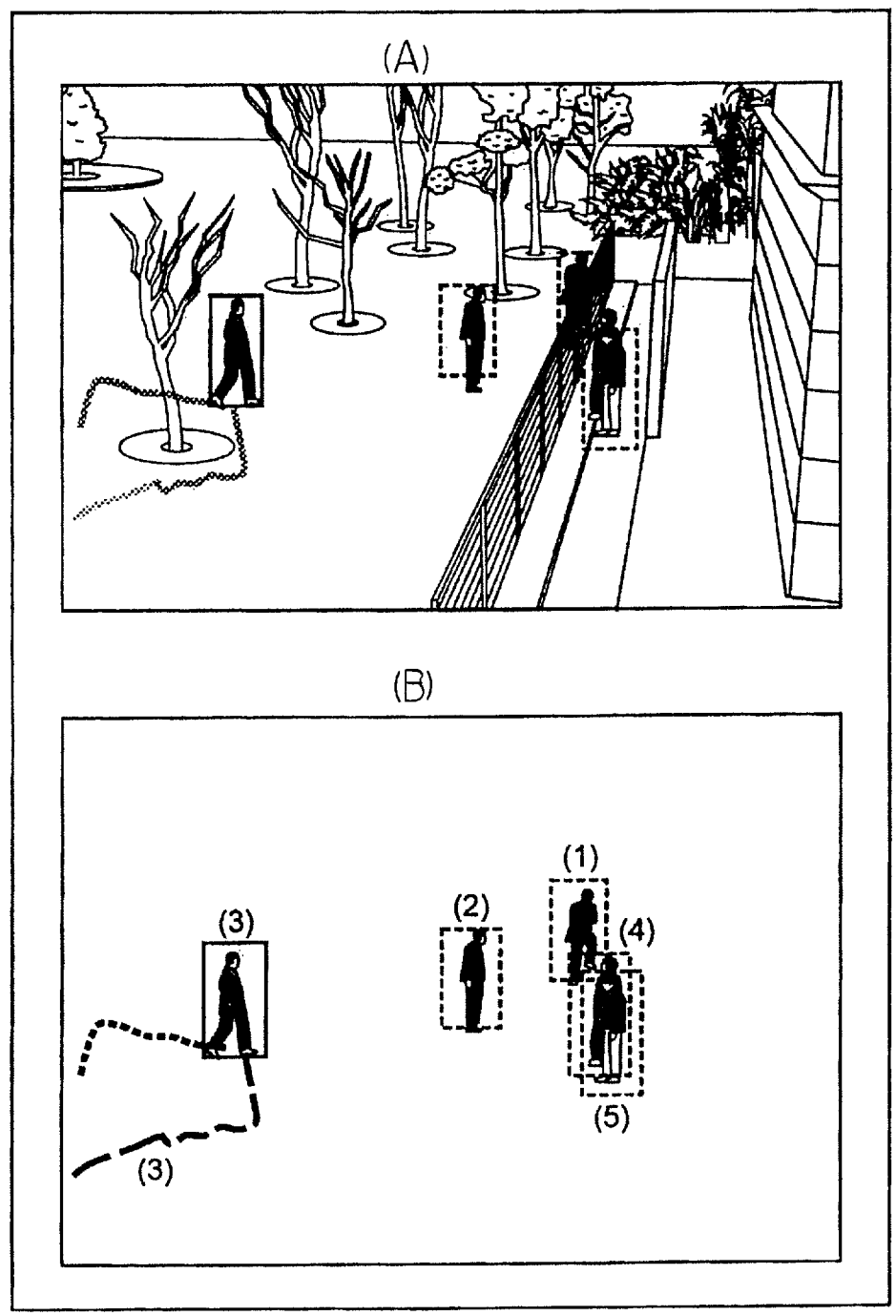
FIG. 13 is an explanatory view showing an example of a display image and an example of a superimposed image at the time of the display image.

The example shown in FIG. 13 is an example of a display image in a case where a tracking target object other than a tracking target object for an alert, such as an intruder, is designated as the object. As shown in FIG. 13, the object whose trajectory is to be displayed is not limited to any particular object, and may be any tracking target object designated by the user, for example.

Figure 14:
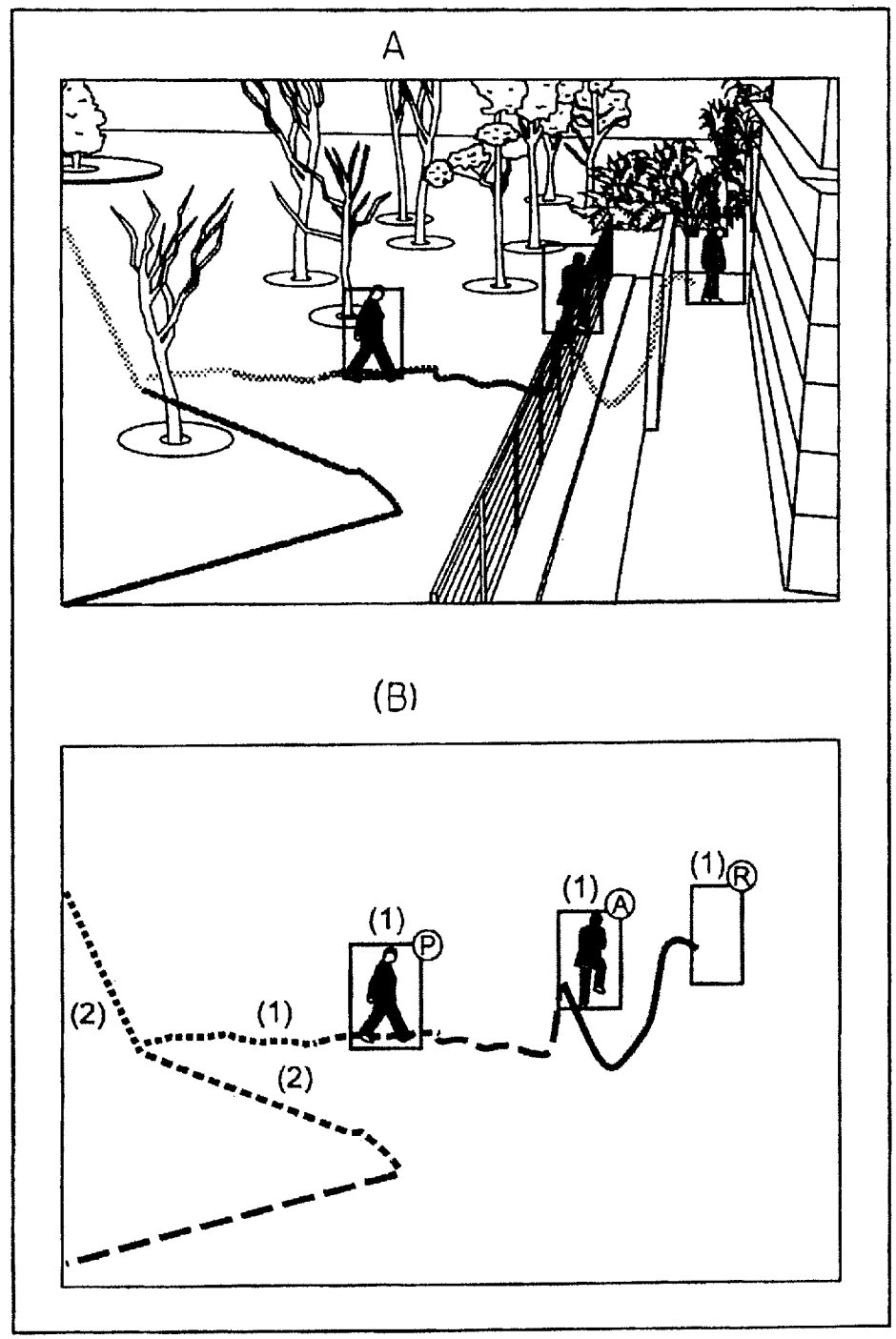
FIG. 14 is an explanatory view showing an example of a display image and an example of a superimposed image at the time of the display image.

The example shown in FIG. 14 is an example of a display image in a case where there is another object related to the object. As shown in FIG. 14, in a case where a connection is recognized between the trajectories of objects such as when a person gets off a vehicle, the display control unit 105 may determine that these objects are related to each other, and superimpose and display the trajectory of the other object, as well as the trajectory of the object, on the background image.

In the example case shown in FIG. 14, the latest image is set as the background image, and the background image including the latest object is updated every moment. However, the background image at the time when the trajectory of a related object is displayed, and the method of updating the background image are not limited to any particular image and any particular method.

Further, in a case where an interaction between the object and another object is detected, the display control unit 105 may display the trajectory of the other object having the interaction with the object, together with the trajectory of the object, even though the interaction is not the object getting off a vehicle. In such a case, a similar notification function may be given to the trajectory of other object.

Figure 15:
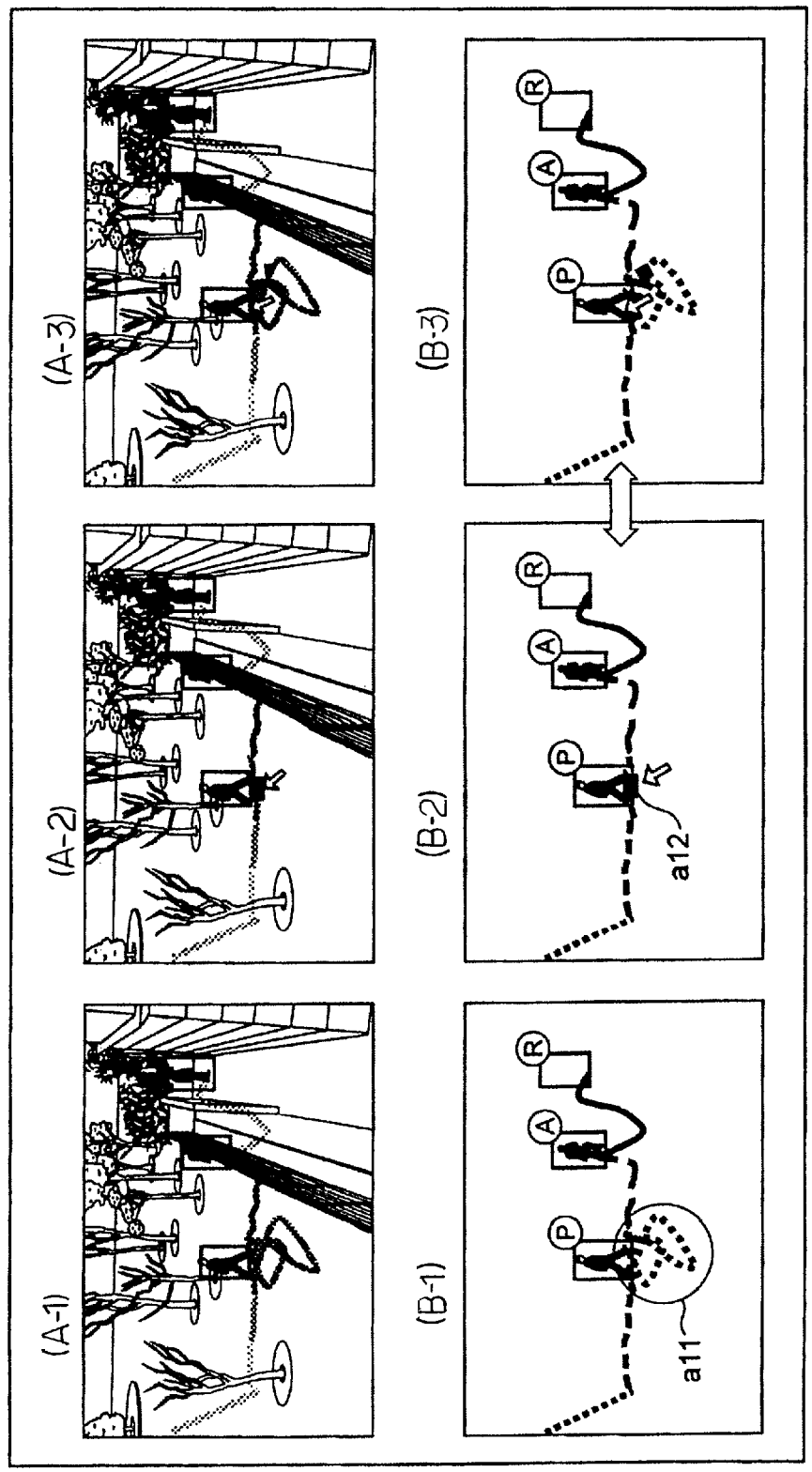
FIG. 15 is an explanatory view showing an example of a display image and an example of a superimposed image at the time of the display image.

The example shown in FIG. 15 is an example of a display image on which a trajectory including a roaming section is superimposed. In FIG. 15, items (A-1) and (B-1) are an example of a display image and an example of a simplified superimposed image on which a roaming section is superimposed without shortening, respectively. Reference numeral a11 in item (B-1) indicates the region in which the object roaming has been detected. Also, items (A-2) and (B-2) are an example of a display image and an example of a simplified superimposed image on which the roaming section is superimposed after being shortened. Further, items (A-3) and (B-3) are an example of a display image and an example of a simplified superimposed image on which the roaming section is superimposed after being shortened and expanded. For example, in a case where the display control unit 105 determines that the object is roaming around a particular region, the display control unit 105 may set a roaming section that is the sections in the trajectory corresponding to the roaming part, and turn the analysis results within the section into a group, to display only typical information.

When performing the grouping, the display control unit 105 preferably displays the information in a mode indicating that the section is a grouped and shortened section (by attaching some symbol or providing a narrowed display, for example). In this example, items (A-1) and (B-1) correspond to the display image prior to the grouping (in a normal state), and items (A-2) and (B-2) correspond to the display image after the grouping.

In a case where the display control unit 105 receives from the user an expansion instruction designating the section in the display image after the grouping, the display control unit 105 may expand and display the section, as shown in items (A-3) and (B-3). In this case, an instruction input about the point within the section after the expansion can be received through a direct click on the mouse wheel or the tracking line after the expansion, an operation of a slide bar or the like alternatively displayed in a predetermined region on the display screen, or the like.

Figure 16:
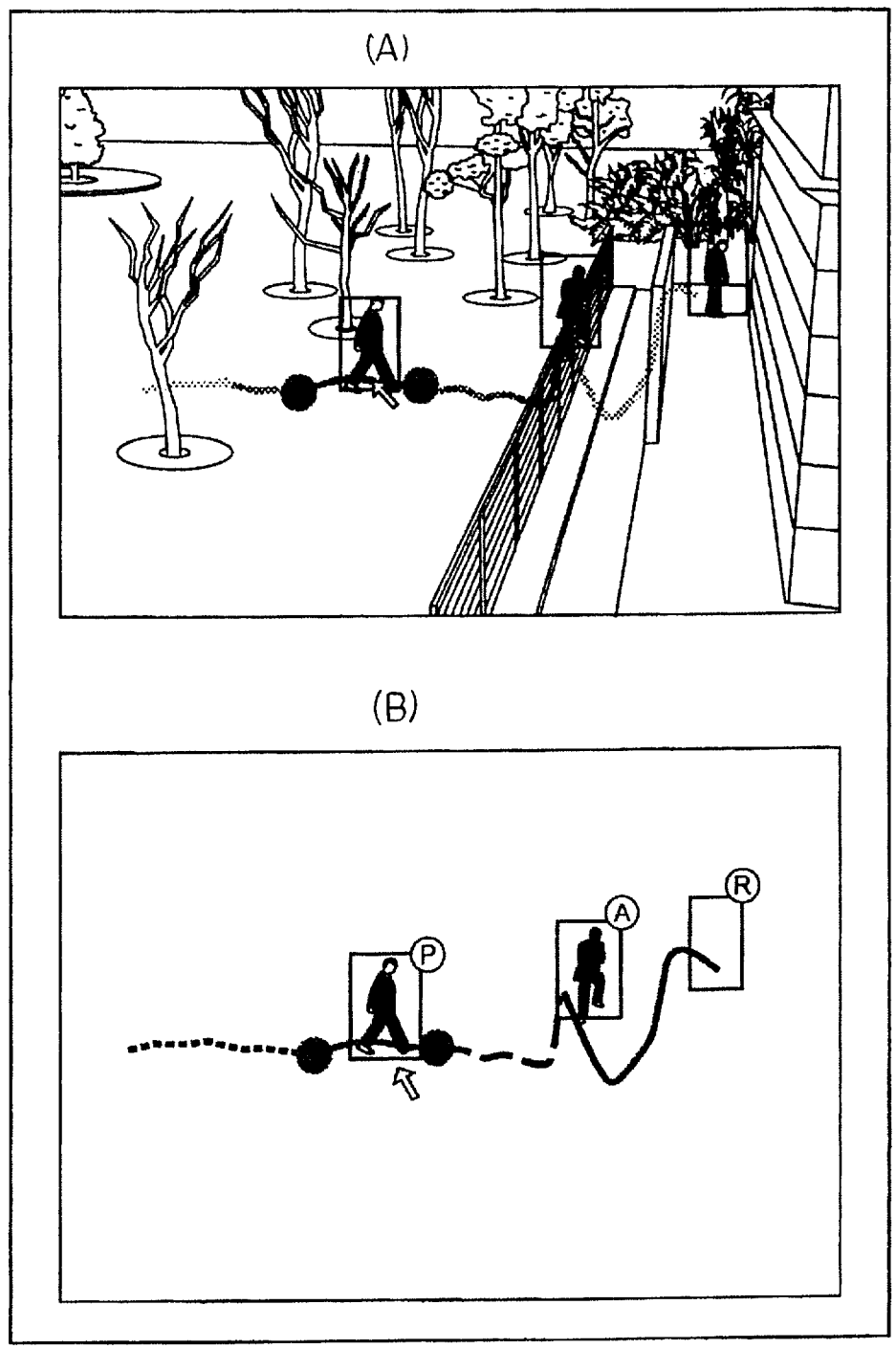
FIG. 16 is an explanatory view showing an example of a display image and an example of a superimposed image at the time of the display image.

The example shown in FIG. 16 is an example in which a section in a specific range designated by the user is displayed as an annotation section in such a mode that the annotation section can be recognized. It should be noted that the display control unit 105 may add time information and image information corresponding to the annotation section to the analysis information so that the supervisor who is not present can be notified of the annotation section. Hereinafter, the information to be added in accordance with such an annotation section will also be referred to as annotation information.

Further, the display control unit 105 may cut out the video image (image group) corresponding to the annotation section, and output the video image to a predetermined device. As a result, the checking costs of the supervisor can be lowered.

Figure 17:
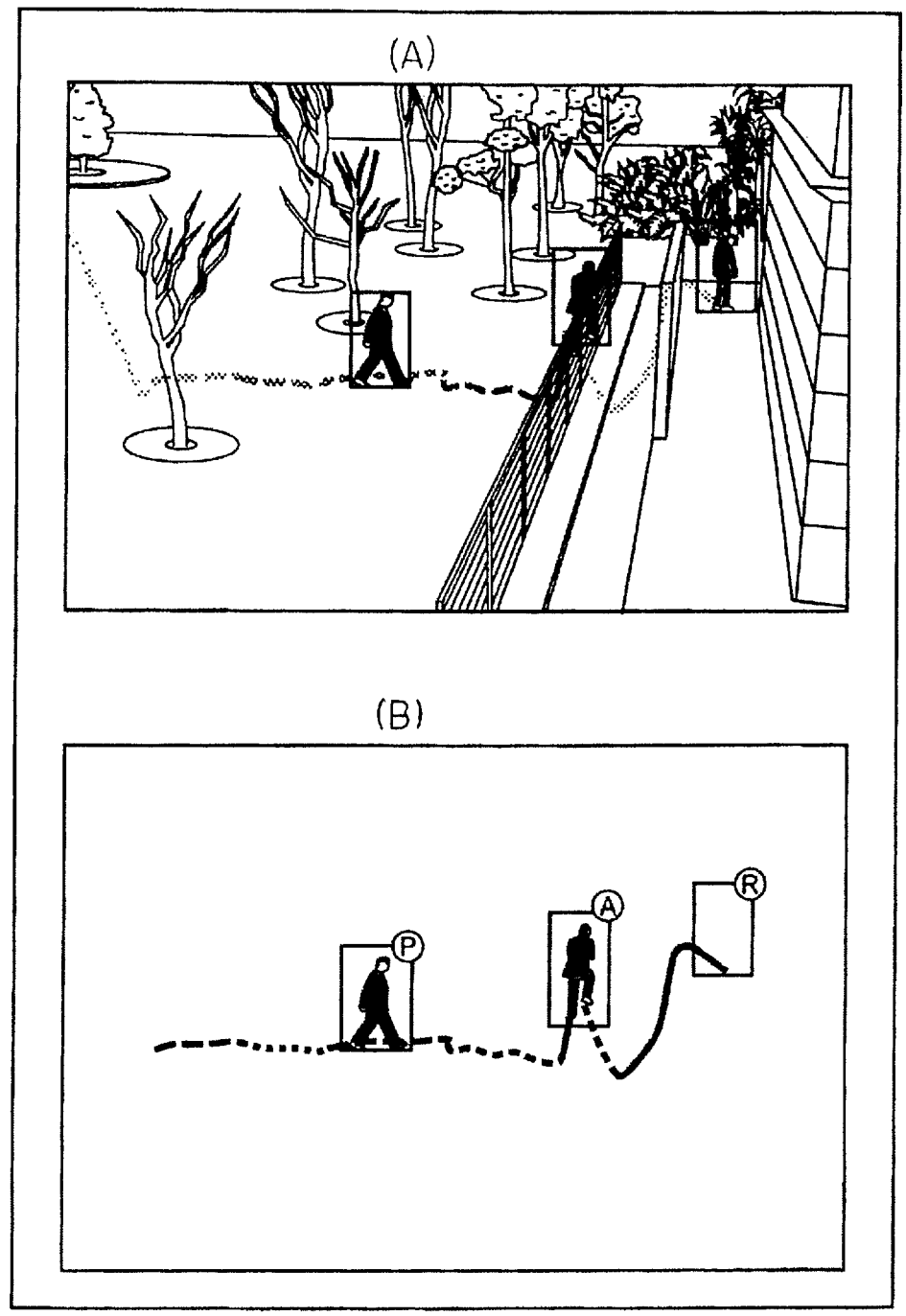
FIG. 17 is an explanatory view showing an example of a display image and an example of a superimposed image at the time of the display image.

The example shown in FIG. 17 is an example in which the results of classification of changes in the direction and the posture of the object are expressed with line types. As shown in FIG. 17, where the display modes are varied within a trajectory in accordance with changes in the state and the features of the object, the operator can determine of which time point an image should be checked to examine the appearance of the object.

As described above, in this embodiment, the trajectory of the object is displayed on the screen currently being checked, while the display mode of a part of the trajectory is made to differ from another part in accordance with the time elapsed since the predetermined time and the results of the analysis of the input video image, or information associated with a point in the trajectory is attached. Thus, the user can intuitively know the elapsed time and the analysis results in association not only with the traveling direction of the object but also with the point in the trajectory of the object.

For example, from the trajectory of the object, the user can know the position of the object (or where the object was located) of the time when a certain period of time elapsed since the predetermined time, and how the object spent time before and after the certain period of time elapsed. From the trajectory of the object, the user can also recognize the situation of the time of intrusion (whether the intrusion really occurred), the state of the object (classification results such as the direction, the posture, the motion, and the color of the outfit), and the presence or absence of another object related to the object.

That is, the display mode of a part of a trajectory is changed in accordance with the time elapsed since the predetermined time or the analysis results (the direction and movement of the object, for example), or information is attached to the vicinity of a part of the trajectory, so that it becomes easy to select at which point in the trajectory the image should be checked to observe the details of the object. Specifically, unless the display mode of a part of the trajectory is changed or information is attached to the vicinity of a part of the trajectory, for example, it is not possible to determine at which point in the trajectory the object should be checked to observe the details of the object. As a result, it takes a long time to check the details of the object. In this embodiment, on the other hand, the trajectory of the point corresponding to the time point when the object is facing toward the camera is thicker than the other points. As a result, in a case where the details of the object are checked from past video images while the current video image is being checked, the thick part of the trajectory should be selected, and the object at the time point corresponding to the point, or the object located at the point, should be checked. Thus, the details of the object can be easily checked. It should be noted that the above effect can also be achieved by narrowing down the objects whose trajectories are to be displayed, the display items, or the range of trajectories, in accordance with designation from the user or a predetermined condition.

In the above described manner, it is possible to present to the user the time elapsed since the predetermined time and the results of analysis of the object by using a trajectory. Thus, the user can promptly recognize the situations of the object at two or more points of time in a video image, in accordance with the information presented by the trajectory currently being displayed. For example, while checking the current image, the user can quickly determine from what point in the past an image should be selected to obtain desired information. The user can also recognize the current position of the object while checking a past image, for example.

Also, depending on the information to be attached to a trajectory, the image of the object at a specific time point (such as an alert issuance time) is superimposed and displayed in the vicinity of the corresponding point in the trajectory, so that the user can know the situations of the object at two or more points of time without switching screens.

As will be described later in detail in a second embodiment, the user may be enabled to designate from which time point the image to be superimposed should be selected, using a trajectory. In this manner, the user can acquire necessary information, without complicating the screen display. Even when such an instruction is received from the user, the trajectory display according to this embodiment can aid the user in determining from which time point the object should be selected and checked. Thus, the user can promptly grasp the situations of the object at two or more points of time in a video image.

Exemplary Embodiment 2

Next, a second embodiment of the present invention is described. In this embodiment, the display control unit 105 has a GUI function in a trajectory superimposed and displayed on a background image. More specifically, the video image processing device 4 further has a GUI function of acquiring a request (predetermined instruction input) that designates a point in the trajectory being displayed, the request being associated with the trajectory superimposed and displayed on the background image, and performing screen control in accordance with the request.

With this function, it becomes possible for the user to check the object of the time when the object was located at the designated point in the same background image along the trajectory, only by tracing the trajectory currently being displayed. Further, the user is enabled to simultaneously display the object from two or more points of time (such as the time point of the background image and the time point corresponding to a designated point, or the time point corresponding to a first designated point and the time point corresponding to a second designated point), and to switch background images.

In the description below, the same components as those of the first embodiment are denoted by the same reference numerals as those used in the first embodiment, and explanation of them will not be made.

The system configuration of a video image analysis system of this embodiment is basically the same as the configuration of the first embodiment shown in FIG. 1. In the example described below, the video image analysis device 2 (the tracking unit 103) detects the position of a tracking target object, and also detects information other than the position (such as the corresponding time, the features of the tracking target object, and another object related to the tracking target object). However, it is not necessary to detect the information. That is, the video image analysis device 2 (the tracking unit 103) of this embodiment should be able to analyze an input video image, and generate analysis information in which position information indicating the position of the tracking target object in the input video image is associated with identification information about the image from which the position was acquired.

Figure 18:
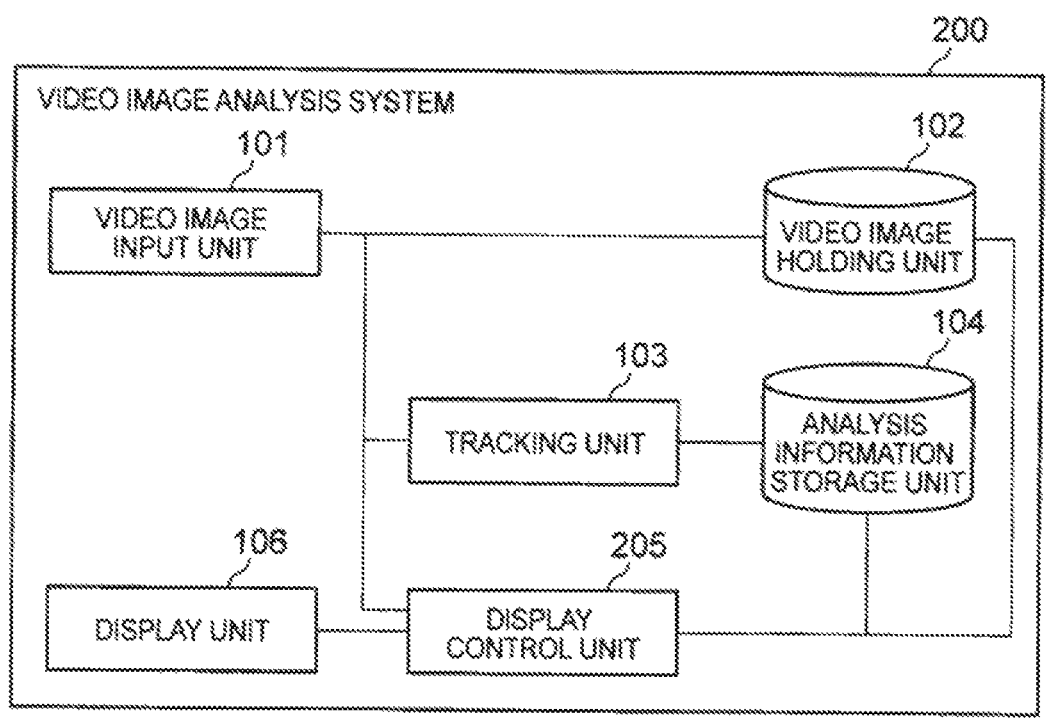
FIG. 18 is a block diagram showing an example configuration of a video image analysis system of a second embodiment.

FIG. 18 is a block diagram showing an example configuration of the video image analysis system of this embodiment. The video image analysis system 200 shown in FIG. 18 includes a display control unit 205, instead of the display control unit 105 of the video image analysis system 100 of the first embodiment shown in FIG. 2.

The display control unit 205 displays the trajectory of a predetermined object in an input video image on the display unit 106. For example, when displaying an input video image, an image at some time point included in the input video image, or a predetermined image generated in accordance with the input video image, the display control unit 205 sets the image as the background image, and superimposes the trajectory of the predetermined object in the input video image on the background image. In this embodiment, the background image is not limited to any particular image, as long as it is an image including the region corresponding to at least a part of the moving path of the object in the image region.

The display control unit 205 of this embodiment further adds a GUI function to the trajectory of the object in the input video image. The GUI function is for acquiring a predetermined request that designates a point in the trajectory currently being displayed, and performing display control in accordance with the request.

For example, the display control unit 205 acquires a first request designating a point in the trajectory currently being displayed, and displays a designated image superimposed on an appropriate background image being displayed on the display unit 106. The designated image includes the object of the time when the object was located at the designated point. Hereinafter, the first request will be also referred to as a "designated image addition request". The point designated by the predetermined request including the first request will be also referred to as the "designated point". In a case where a section is designated in the request, the section will be also referred to as the "designated section".

At this stage, the display control unit 205 may superimpose a designated image, every time the designated point changes. The designated image includes the object of the time when the object was located at the designated point. In this manner, the user can be enabled to check the object shown in the image corresponding to the time point of a pointed spot in the same image, simply by moving the position of the pointed spot in the trajectory. It should be noted that the display control unit 205 may superimpose a designated image that is an image generated when the object was located at the designated point among the images included in the video image (this image will be hereinafter referred to as the corresponding image).

For example, in a case where a first request is a request that is input together with the position information about a pointed spot when the spot pointed by a pointing device is moved in a trajectory, the display control unit 205 may superimpose, every time a first request is acquired, a designated image including the object of the time when the object was located at the point indicated by the position information as the designated point. In this manner, the user can check the object of the time when the object was located at the designated point in the same image, simply by tracing the trajectory.

For example, in a case where an image is obtained by cutting out the object region of an object from an image (corresponding image) generated when the object was located at a designated point among the images included in a video image, and the obtained image is used as the designated image, the display control unit 205 superimposes the designated image in the position corresponding to the position of the object in the corresponding image in the background image. The display control unit 205 may superimpose the designated image on the background image after determining the position and the size in which the designated image is superimposed on the background image in accordance with the position and the size of the object in the corresponding image, for example.

Further, in a case where an image obtained by cutting out the object from the corresponding image is used as the designated image, for example, the display control unit 205 may superimpose a second designated image, together with the designated image, on the background image. The second designated image is obtained by cutting out another object related to the object from the corresponding image.

The display control unit 205 may also acquire a second request designating a point in the trajectory currently being displayed, and switch the background image to the corresponding image. At the same time as the switching, the display control unit 205 may superimpose and display the trajectory of the object on the switched background image. Hereinafter, the second request will also be referred to as the "background switching request".

The display control unit 205 may also acquire a third request designating a point or a section in the trajectory currently being displayed. The display control unit 205 may then add information indicating the designation to the image (corresponding image) generated when the object was located at the designated point or section among the images included in the video image, or may extract the image and output the image to the outside. Further, the display control unit 205 may set the section at this stage as the annotation section. The display control unit 205 may then make the display mode of the section differ from the other sections in the image currently being displayed, and add information indicating the variation to the section. Hereinafter, a third request will also be referred to as an "annotation addition request".

When displaying a trajectory, the display control unit 205 may also superimpose a designated image, together with the trajectory, on the background image. The designated image is obtained from the image of a time when a predetermined condition was satisfied in the input video image. This is equivalent to the display of a trajectory accompanied by the object image of a specific point time in the first embodiment.

When superimposing the designated image on the background image, the display control unit 205 may further superimpose identification information about the object or information about the time point corresponding to a designated point, on the designated image, for example. This is equivalent to the associating by assigning the same numbers or the like to indicate the identity of the object, and the adding of information (such as circled P, circled A, and circled R) in accordance with the elapsed time or the corresponding time in the first embodiment.

The display control unit 205 may also acquire a fourth request designating a point or a section in the trajectory currently being displayed, for example. The display control unit 205 may then display a designated image on the background image until an instruction to cancel the fourth request is acquired. The designated image includes the object of the time when the object was located at the designated point. Hereinafter, the fourth request will also be referred to as the "designated image pinning request".

Without acquiring any request, the display control unit 205 can constantly display the image of the object of an alerting time point or the image of a related object at the alerting time point, for example, after adding a symbol or the like indicating the alerting time point, as in the first embodiment.

Further, the display control unit 205 may add a GUI function not only to a trajectory but also to the object region of the tracking target object included in a display image. That is, in a case where tracking target objects other than the current object are displayed in a display image (the tracking target objects are shown in or superimposed on the background image), the display control unit 205 can cause the user to select the object whose trajectory is to be newly displayed from among the tracking target objects. For example, in a situation where tracking target objects other than the current object are displayed on the screen as shown in FIG. 12, when an object switching request that designates a tracking target object other than the current object is acquired from the user, the display control unit 205 may set the designated tracking target object as the new object, and display the trajectory of the new object on the current background image. At this stage, the trajectory of the previous object may be left behind or erased, or may be selected by the user.

Further, the display control unit 205 can also perform control to display time information and the detected item that triggered an alert, receive a user operation or the like in response to the display, and display the image of the time corresponding to those items. In this case, the display method may be a method of further superimposing the image on the display image currently being displayed, or a method of displaying the image by switching background images. In a case where the image is further superimposed, the entire image of the corresponding time may be superimposed, or a part (the corresponding part) of the image may be cut out and then be superimposed.

In this embodiment, the display control unit 205 is also formed with an information processing device such as a CPU included in the video image processing device 4.

Figure 19:
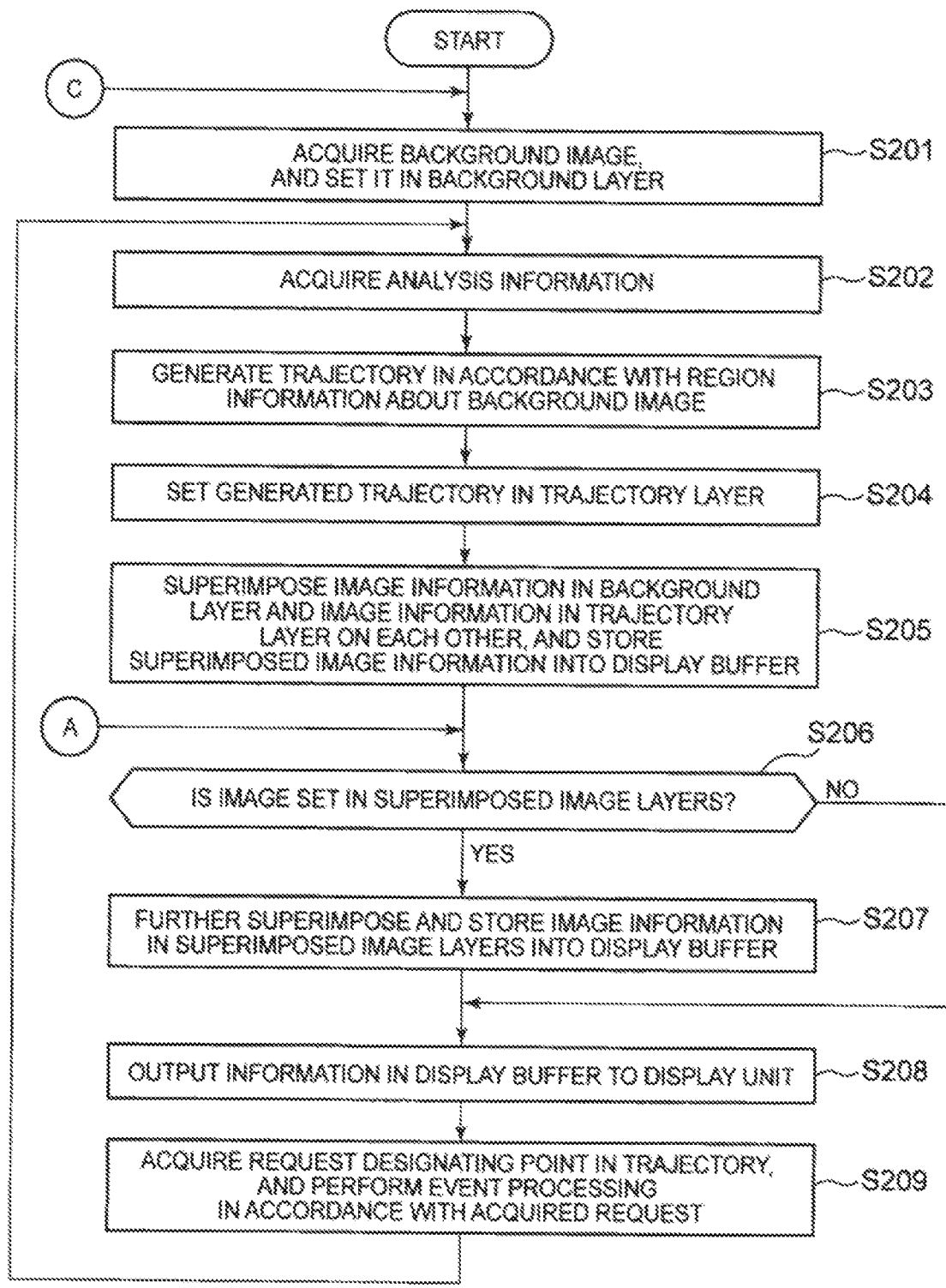
FIG. 19 is a flowchart showing an example of display control in a display control unit 205.

Next, an operation according to this embodiment is described. FIG. 19 is a flowchart showing an example of display control in the display control unit 205.

In this example, it is also assumed that, prior to step S201, the background image and the object to be displayed are designated by the user or are determined in advance. It is also assumed that an image that can be a background image (such as a predetermined amount of image in an input video image or an image generated from the input video image) is stored in the video image holding unit 102 together with its identifier. Further, it is assumed that the analysis information storage unit 104 stores analysis information in which information indicating the analysis results including the position acquired from the input video image by the tracking unit 103 and the other detected items is associated with identification information about the image from which the position was acquired in the input video image.

In the example described below, the image information about the display image to be displayed on the display unit 106 is divided into layers, and the layers are stored and managed. The layers are then superimposed on one another, and are output. However, the method of generating a display image is not limited to this example.

In the example shown in FIG. 19, the display control unit 205 first acquires a background image from the video image holding unit 102, and sets the background image in a background layer (step S201). More specifically, setting in a layer means storing the image information about the image to be displayed in the layer into a buffer provided for the layer.

The display control unit 205 then acquires analysis information from the analysis information storage unit 104 (step S202).

The display control unit 205 then generates a trajectory of the object suitable for the background image in accordance with the region information about the background image, and sets the generated trajectory in a trajectory layer (steps S203 and S204). At this stage, the display control unit 205 generates a trajectory (a trajectory image) in which a point is time in the trajectory is associated with the image or the time point in the input video image or time information about the time point.

The display control unit 205 then superimposes the image information in the background layer and the image information in the trajectory layer on each other, and stores the superimposed image information into the display buffer that stores the image information to be output to the display unit 106 (step S205).

At this stage, if there is an object image or the like to be displayed in advance, the display control unit 205 may convert the object image as a designated image into an image in the position and the size corresponding to those of the corresponding image set as the background image. The display control unit 205 may then set the object image, together with a pinning flag, in a superimposed image layer in which the designated image is to be set. The number of superimposed image layers is equal to the number of images to be superimposed on one another.

The display control unit 205 then determines whether an image is set in a superimposed image layer (step S206), to superimpose the designated images set so far on the background image. If an image is set in a superimposed image layer (Yes in step S206), the display control unit 205 further superimposes and stores the set image into the display buffer (step S207).

If images are set in two or more superimposed image layers, the display control unit 205 superimposes and stores all the set images into the display buffer in step S207. The display control unit 205 then moves on to step S208.

If any image is not set in the superimposed image layers (No in step S206), on the other hand, the display control unit 205 moves on directly to step S208.

In step S208, the display control unit 205 outputs the image information stored in the display buffer to the display unit 106.

Through the above described operation in steps S201 to S208, a display image in which the background image, the trajectory, and, if any, the image(s) set in the superimposed image layers are superimposed on one another is displayed on the display unit 106.

In the situation where an image is displayed on the display unit 106, the display control unit 205 acquires a predetermined request including designation of a point in the trajectory currently being displayed. In this example, the display control unit 205 receives an event corresponding to the request. The display control unit 205 then performs the processing corresponding to the event (step S209: event processing). Examples of the event processing are shown in FIGS. 20 to 25.

The display control unit 205 may return to step S202 after a predetermined time has passed since the end of the event processing, for example, and acquire a request while repeating the operation in steps S202 to S208, to update the trajectory.

Referring now to FIGS. 20 to 25, examples of the event processing are described.

Figure 20:
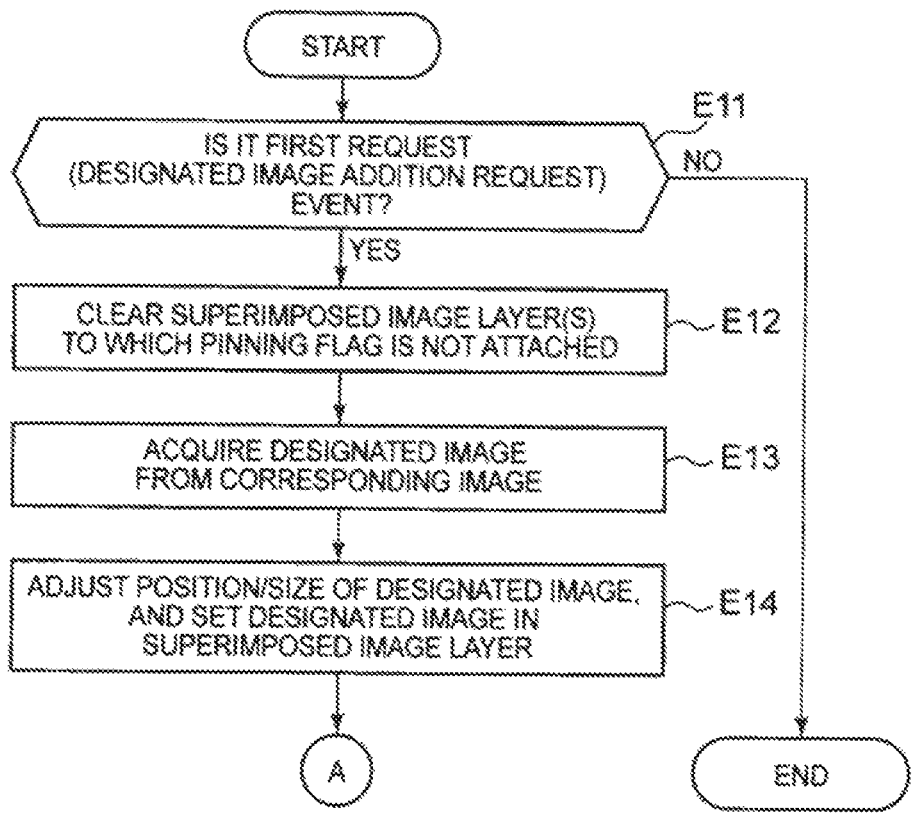
FIG. 20 is a flowchart showing an example of event processing.

FIG. 20 is a flowchart showing an example of the event processing in accordance with a first request (designated image addition request). In the example shown in FIG. 20, the display control unit 205 performs the processing in steps E11 to E14 in a case where the accepted event is a first request event indicating that a first request has been acquired (Yes in step E11).

The display control unit 205 first clears the superimposed image layer(s) to which the pinning flag is not attached (step E12). Here, the pinning flag is the flag indicating that the image in the corresponding superimposed image layer is to be constantly displayed. In step E12, the designated point image(s) set in the superimposed image layer(s) to which the pinning flag, which was displayed before the first request, can be cleared at the next display image update timing.

The display control unit 205 then acquires the designated image from the corresponding image corresponding to the point designated by the first request related to the event, adjusts the position and the size as necessary, and sets the designated image in a new superimposed image layer (steps E13 and E14). To reflect the setting contents in the display image, the display control unit 205 returns to step S206.

In this manner, the designated image obtained from the corresponding image corresponding to the designated point is superimposed on the current display image.

Figure 21:
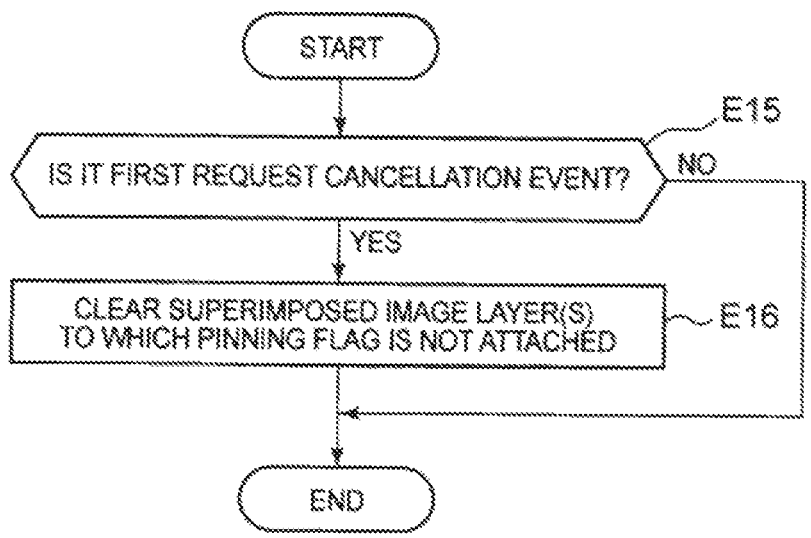
FIG. 21 is a flowchart showing an example of event processing.

FIG. 21 is a flowchart showing an example of event processing corresponding to a first request cancellation event indicating that a first request is invalidated. Here, the first request cancellation event supposedly occurs when the point designated by a first request moves to another position or when a first request indicating a new point is received.

In the example shown in FIG. 21, the display control unit 205 performs the processing in step E16 in a case where the accepted event is a first request cancellation event (Yes in step E15).

Specifically, the display control unit 205 clears the superimposed image layer(s) to which the pinning flag is not attached (step E16).

As a result, at the display screen update timing, the designated image that is superimposed on the current display image and corresponds to the point prior to the movement or the point designated by the previous first request is cleared.

It should be noted that, after step E16, the display control unit 205 may immediately return to step S205 and update the display screen.

Figure 22:
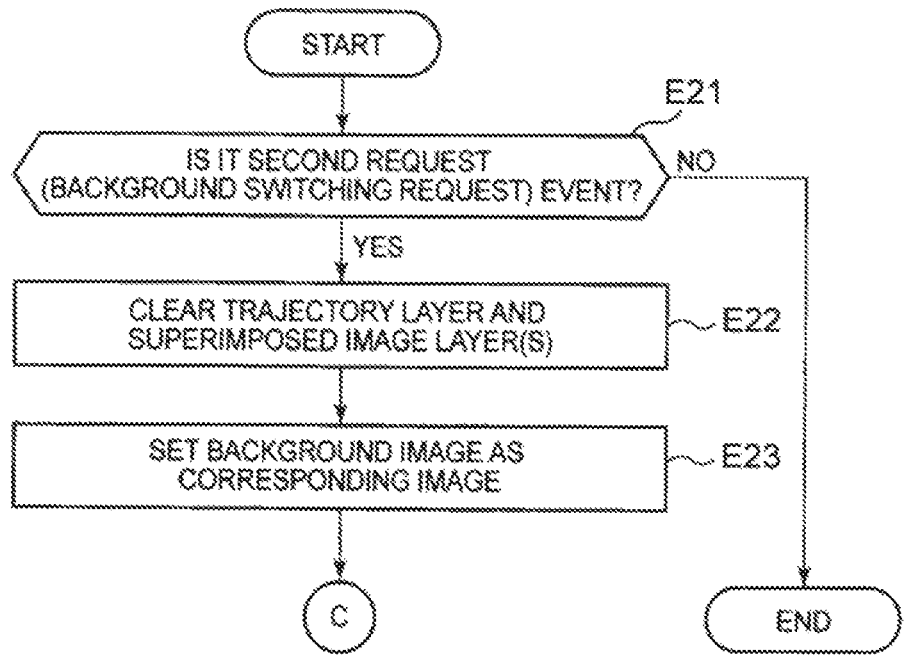
FIG. 22 is a flowchart showing an example of event processing.

FIG. 22 is a flowchart showing an example of event processing corresponding to a second request (a background switching request). In the example shown in FIG. 22, the display control unit 205 performs the processing in steps E22 and E23 in a case where the accepted event is a second request event indicating that a second request has been acquired (Yes in step E21).

The display control unit 205 first clears all of the trajectory layer and the superimposed image layers (step E22).

The display control unit 205 then sets a background image that is the corresponding image corresponding to the designated point (step E23). To reflect the setting contents in the display image, the display control unit 205 returns to step S201.

As a result, the corresponding image is set as the background image, and a display image in which a trajectory is superimposed on the background image is displayed on the display unit 106. At this stage, if there is an object image to be displayed, the display control unit 205 may convert the object image as a designated image into an image in the position and the size corresponding to those of the corresponding image set as the background image. The display control unit 205 may then set the object image, together with a pinning flag, in a superimposed layer.

Figure 23:
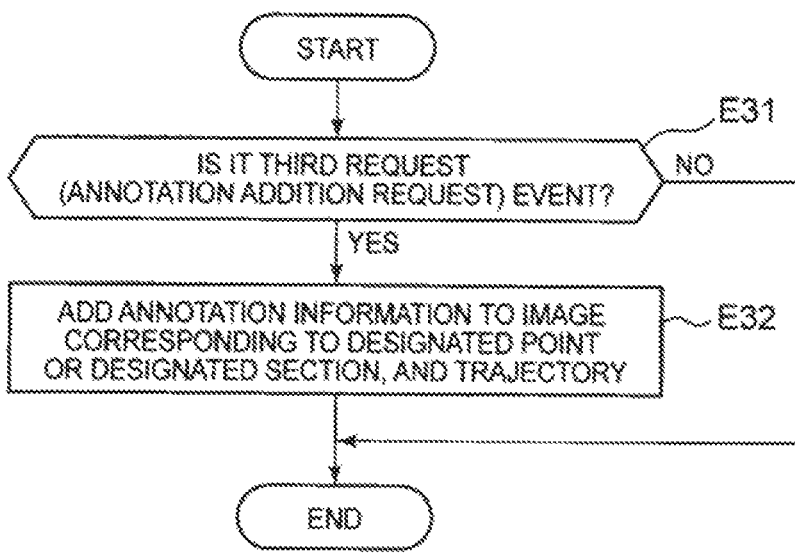
FIG. 23 is a flowchart showing an example of event processing.

FIG. 23 is a flowchart showing an example of event processing corresponding to a third request (an annotation addition request). In the example shown in FIG. 23, the display control unit 205 performs the processing in step E32 in a case where the accepted event is a third request event indicating that a third request has been acquired (Yes in step E31).

Specifically, the display control unit 205 adds annotation information (information indicating that the user has issued an instruction) to the image corresponding to the designated point or the designated section and the trajectory (step E32).

It should be noted that the display control unit 205 may further cut out an image corresponding to the designated point or the designated section from an input video image, and output the image to the outside.

Figure 24:
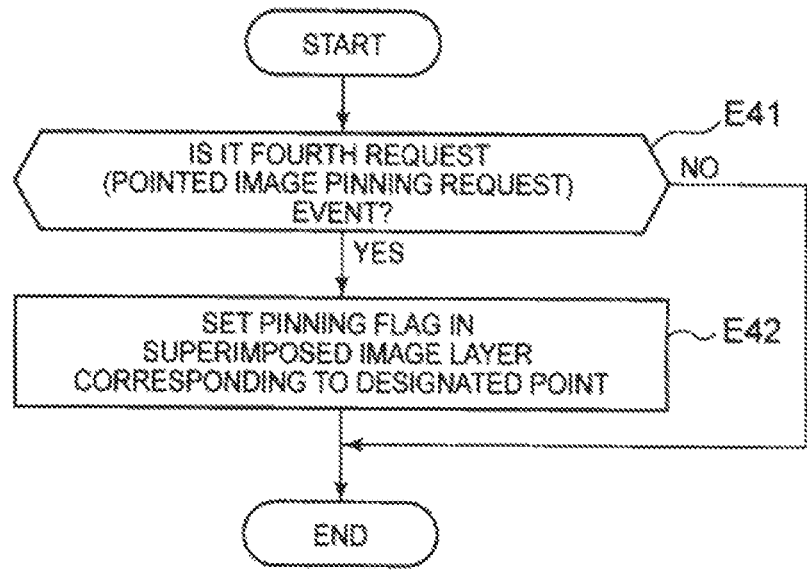
FIG. 24 is a flowchart showing an example of event processing.

FIG. 24 is a flowchart showing an example of event processing corresponding to a fourth request (a designated image pinning request). In the example shown in FIG. 24, the display control unit 205 performs the processing in step E42 in a case where the accepted event is a fourth request event indicating that a fourth request has been acquired (Yes in step E41).

Specifically, the display control unit 205 sets a pinning flag in the superimposed image layer in which the designated image corresponding to the designated point is set (step E42).

In this manner, the designated image currently being displayed is prevented from being cleared at the next display screen update timing and later.

Figure 25:
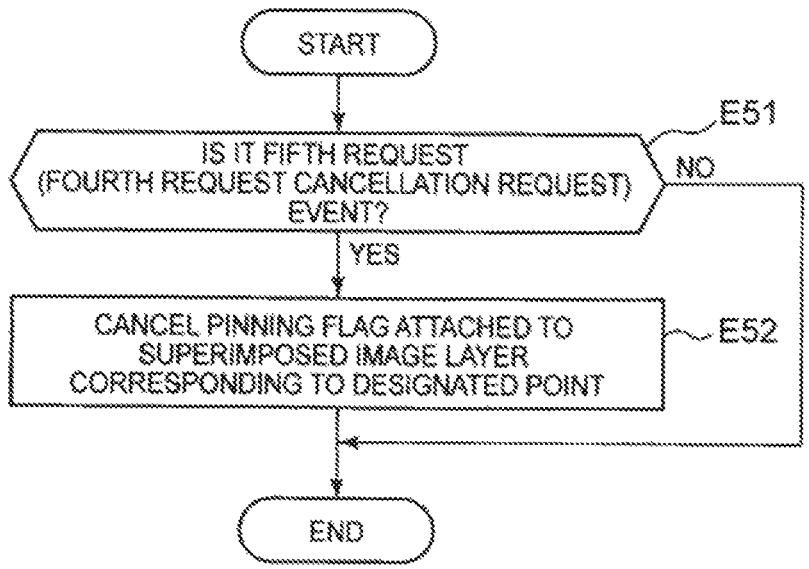
FIG. 25 is a flowchart showing an example of event processing.

FIG. 25 is a flowchart showing an example of event processing corresponding to a fifth request event corresponding to a fifth request (a fourth request cancellation request). In the example shown in FIG. 25, the display control unit 205 performs the processing in step E52 in a case where the accepted event is a fifth request event indicating that a fifth request has been acquired (Yes in step E51).

Specifically, the display control unit 205 cancels the pinning flag in the superimposed image layer in which the designated image corresponding to the designated point is set (step E52).

In this manner, the designated image currently being displayed in a pinned manner is cleared at the next display screen update timing.

Next, examples of display images in this embodiment are described. First, examples of composite patterns of display images in this embodiment are described.

Figure 26:
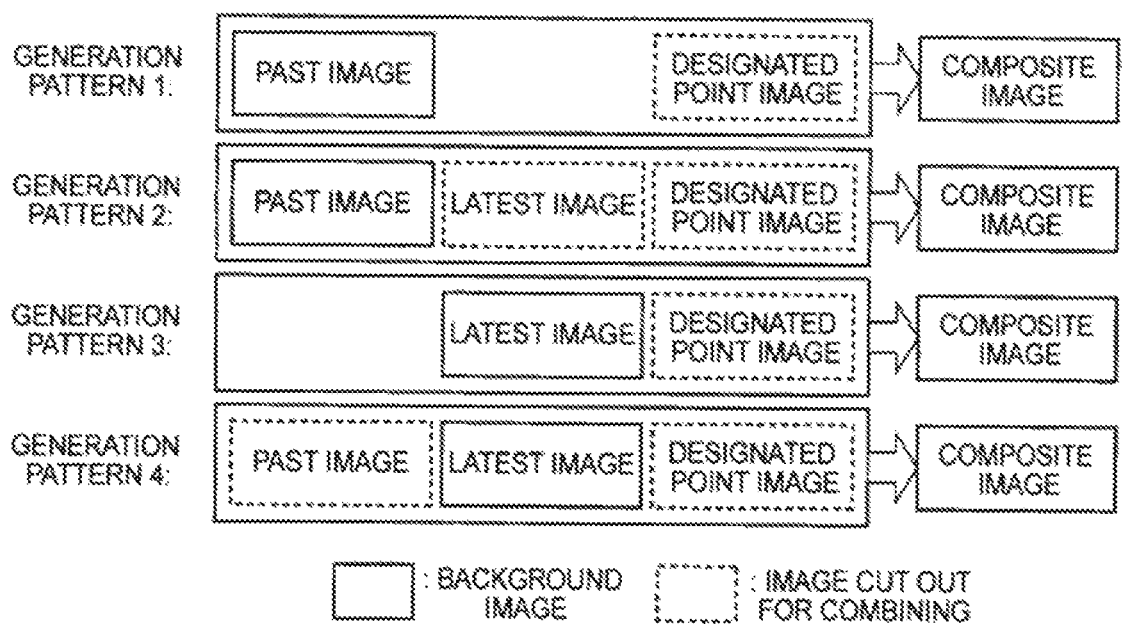
FIG. 26 is an explanatory diagram showing an example of composite pattern of display images.

FIG. 26 is an explanatory diagram showing an example of generation patterns for composite images (display images) to be generated in this embodiment. In FIG. 26, examples of generation patterns for display images from which trajectories are removed are shown. As shown in FIG. 26, the display control unit 205 may generate a display image by superimposing an image cut out from a designated point image on a past image, for example (generation pattern 1). Here, the designated point image corresponds to the above mentioned corresponding image. The image cut out from the designated point image corresponds to the above mentioned designated image.

Also, the display control unit 205 may generate a display image by superimposing an image cut out from the latest image and an image cut out from a designated point image on a past image, for example (generation pattern 2). Here, the image cut out from the latest image may be the object image of the object included in the latest image.

Also, the display control unit 205 may generate a display image by superimposing an image cut out from a designated point image on the latest image, for example (generation pattern 3).

Further, the display control unit 205 may generate a display image by superimposing an image cut out from a past image and an image cut out from a designated point image on the latest image, for example (generation pattern 4). Here, the image cut out from a past image may be an object image of an object or a related object included in any of the past images. Examples of such object images include an object image of an object or a related object included in the past image at a specific time point, such as an alerting time point, a time point when a feature change was detected, or a time point when there was an interaction with another related object.

Figure 27:
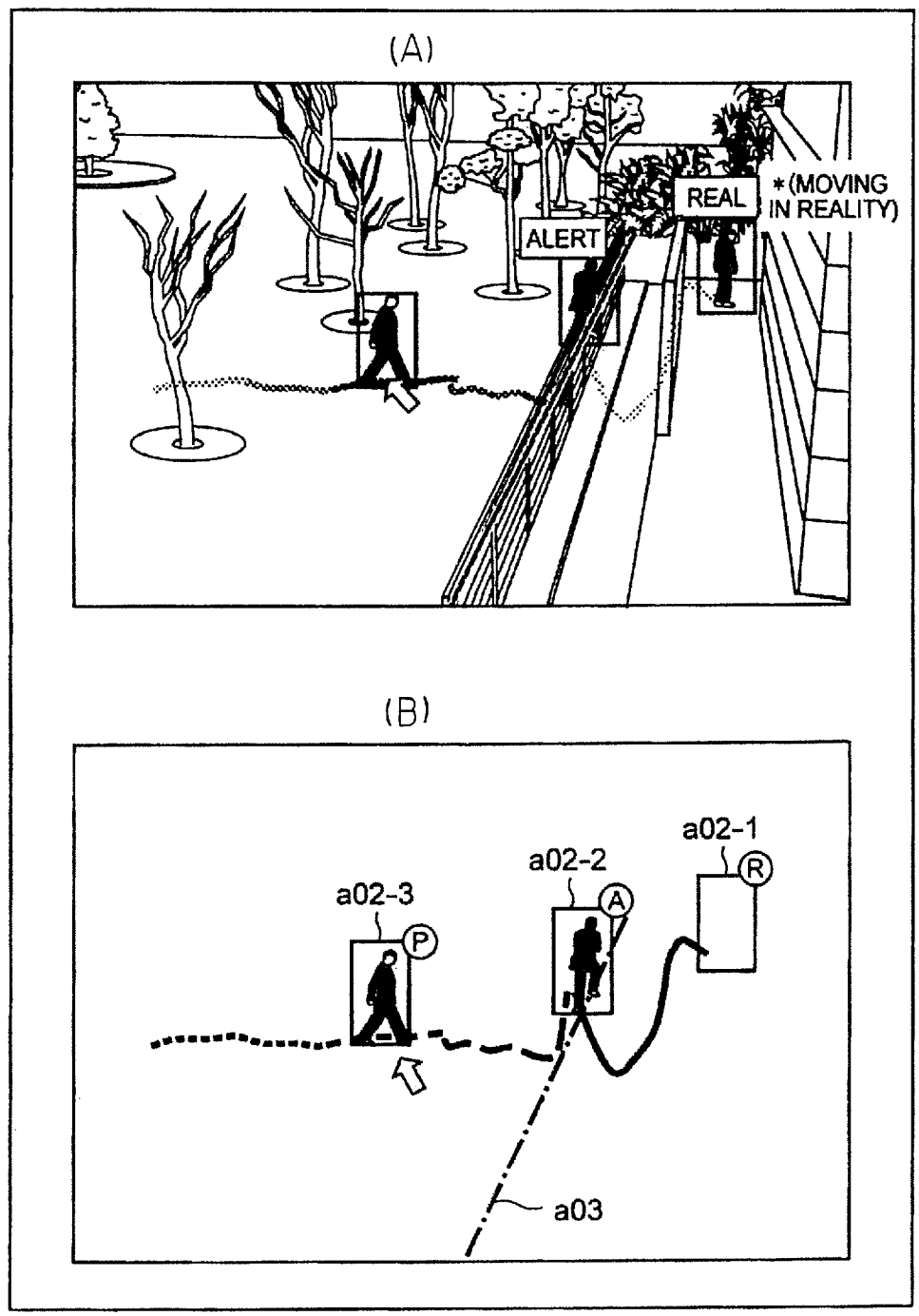
FIG. 27 is an explanatory view showing an example of a display image and an example of a superimposed image at the time of the display image.

FIGS. 27 to 29 are explanatory views showing examples of display images according to this embodiment. In each of these drawings in this embodiment, item (A) is an explanatory view showing an image obtained by converting a display image as a color image into a gray scale image, and item (B) is an explanatory view showing a simplified superimposed image that is an image other than the background image in the display image, as in the first embodiment.

The example shown in FIG. 27 is an example of the display image to be displayed after the user issues a first request designating the point corresponding to a certain past time point in a trajectory in a display image in which the latest image is set as the background image and the background image including the latest object is updated every moment. In this example, the point designated by the first request is indicated by a white arrow.

As shown in FIG. 27, in response to the first request, the display control unit 205 may further superimpose and display a designated image (the object image at that time) on the display image. The designated image is formed by cutting out an object region a02-3 of the object from the corresponding image corresponding to the designated point.

In this example, before the first request is acquired, a trajectory and a designated image obtained by cutting out an object region a02-2 of the object from the corresponding image at the time of issuance of an alert are superimposed on the latest image.

The example shown in FIG. 28 is an example of a display image that is displayed while the designated image to be superimposed on the display image is changed with movement of such a first request. In the drawing, the object region a02-3, an object region a02-4, and an object region a02-5 are displayed at the same time. In practice, however, these regions are switched on display, in accordance with movement of the pointed spot (the white arrow in the drawing).

The example shown in FIG. 28 is an example of a display device in a case where the user designates a certain time point in the past in a situation where the latest image is set as the background image, and the background image including the latest object is updated every moment. As shown in FIG. 28, in a case where the user designates a point in the tracking line of the object, for example, the display control unit 105 may superimpose and display the object image (the object region a02-3 in the drawing) of the object of the time when the object was located at the point, and an object image of a related object (see the object region a02-4 in the drawing). In this manner, the user may also be enabled to check the characteristics and the like of a related object.

In a case where an interaction between the object and another object, other than the object getting off a vehicle, is detected, the display control unit 205 may set the image of the other object of the time of the interaction as an image of a related object, and superimpose and display the image, together with the image of the object of the same time point.

As described above, according to this embodiment, the user simply designates a trajectory currently being displayed, an object region of the object accompanying the trajectory, or an object region of a related object, and makes a predetermined input. In this manner, a cut-out image corresponding to a designated point can be displayed, or background images can be switched. Thus, the states of the object at two or more points of time in a video image and the states of the surroundings can be promptly grasped.

In the above described example, the display control unit 205 of this embodiment also adds a notification function to a trajectory as described in the first embodiment. However, the display control unit 205 can add only a GUI function to a trajectory, without giving such a notification function to the trajectory. That is, it is possible to provide a GUI function of this embodiment even for simple trajectory display.

Figure 30:
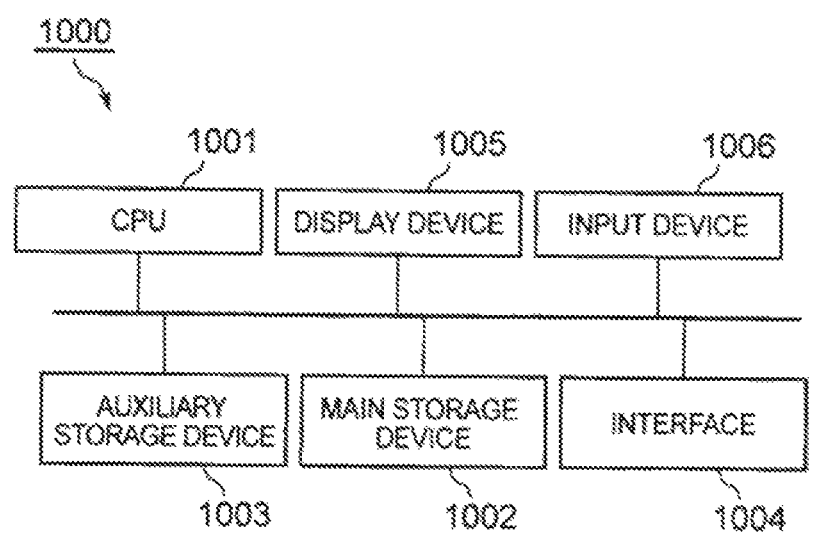
FIG. 30 is a schematic block diagram showing an example configuration of a computer according to an embodiment of the present invention.

Next, an example configuration of a computer according to an embodiment of the present invention is described. FIG. 30 is a schematic block diagram showing an example configuration of a computer according to an embodiment of the present invention. A computer 1000 includes a CPU 1001, a main storage device 1002, an auxiliary storage device 1003, an interface 1004, a display device 1005, and an input device 1006.

The video image analysis device and the video image processing device described above may be mounted on the computer 1000, for example. In that case, operations of the respective devices may be stored as a program in the auxiliary storage device 1003. The CPU 1001 reads the program from the auxiliary storage device 1003, loads the program into the main storage device 1002, and performs predetermined processing according to the above embodiments, in accordance with the program.

The auxiliary storage device 1003 is an example of a non-transitory physical medium. Other examples of non-transitory physical media include magnetic disks, magneto-optical disks, CD-ROMs, DVD-ROMs, semiconductor memories, and the like to be connected to the computer 1000 via the interface 1004. Further, in a case where this program is delivered to the computer 1000 via a communication line, the computer 1000 may load the program into the main storage device 1002 after receiving the delivery, and perform predetermined processing according to the above embodiments.

Further, the program may be for performing part of the predetermined processing in each embodiment. Furthermore, the program may be a differential program for performing predetermined processing according to the above embodiments in combination with another program already stored in the auxiliary storage device 1003.

The interface 1004 transmits and receives information to and from other devices. The display device 1005 presents information to users. The input device 1006 receives inputs of information from users.

Depending on the details of processing in an embodiment, some of the components of the computer 1000 can be omitted. For example, if the device does not present information to users, the display device 1005 can be omitted.

Part or all of each component of each device is implemented by general-purpose or special circuitry, processors or the like, or combinations thereof. These may be formed with a single chip or may be formed with chips connected via a bus. Alternatively, part or all of each component of each device may be formed with a combination of the above mentioned circuitry or the like and a program.

In the case where part or all of each component of each device is formed with information processing devices and circuitry or the like, the information processing devices and the circuitry or the like may be arranged in a centralized manner or a distributed manner. For example, the information processing devices and the circuitry or the like may be formed with a client and server system, a cloud computing system, and the like connected to one another via a communication network.

Figure 31:
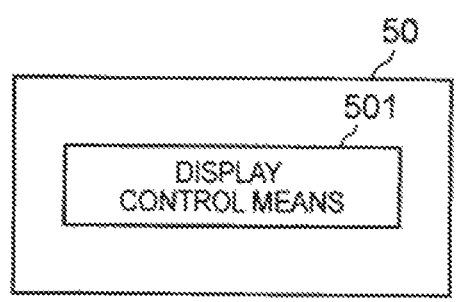
FIG. 31 is a block diagram showing the outline of a video image processing device of the present invention.

FIG. 31 is a block diagram showing the outline of a video image processing device of the present invention. As shown in FIG. 31, the video image processing device 50 of the present invention may include a display control means 501.

The display control means 501 (the display control unit 105 or 205, for example) acquires a first request designating a point in the trajectory being displayed, and displays a designated image including the object which it was located at the designated point by superimposing it on an arbitrary background image being displayed on the display unit.

Instead of the above processing, according to a feature of the object shown in an analysis result obtained as a result of analysis of a video image, a feature of another object related to the object shown in the analysis results, or an time elapsed time from a predetermined time, the display control means 501 may make the display mode of a part of the trajectory differ from another part, or attach information indicating the analysis result or the elapsed time to the vicinity of a part of the trajectory.

By adding a specific notification function and a GUI function to the trajectory, the user can promptly grasp the situations of the object at two or more points of time in a video image.

The exemplary embodiments disclosed above can be described as the following supplementary notes.

Supplementary Note 1.

A video image processing device comprising a display control means that causes a display unit to display a trajectory indicating a change in a position of an object in a video image, wherein the display control means acquires a first request designating a point in the trajectory being displayed, and displays a designated image including the object which it was located at the designated point by superimposing it on an arbitrary background image being displayed on the display unit.

Supplementary Note 2.

The video image processing device according to Supplementary note 1, wherein, every time the designated point changes, the display control means superimposes, on the background image, the designated image including the object which it was located at the designated point.

Supplementary Note 3.

The video image processing device according to Supplementary note 1 or 2, wherein the designated image is an image obtained by cutting out the object from a corresponding image being an image generated when the object was located at the designated point among images included in the video image and, when superimposing the designated image on the background image, the display control means superimposes a second designated image together with the designated image on the background image, the second designated image being an image obtained by cutting out another object related to the object from the corresponding image.

Supplementary Note 4.

The video image processing device according to Supplementary note 3, wherein the another object related to the object draws a trajectory having a predetermined relationship with the trajectory of the object in the video image.

Supplementary Note 5.

The video image processing device according to any of Supplementary notes 1 to 4, wherein the display control means acquires a second request designating a point in the trajectory being displayed, and switches the background image to a corresponding image being an image generated when the object was located at the designated point among images included in the video image.

Supplementary Note 6.

The video image processing device according to any of Supplementary notes 1 to 5, wherein the display control means acquires a third request designating one of a point and a section in the trajectory being displayed, and attaches information indicating the designation to an image generated when the object was located at the designated one of the point and the section among images included in the video image, or extracts the image from the video image and outputs the image to outside.

Supplementary Note 7.

The video image processing device according to any of Supplementary notes 1 to 6, wherein the display control means attaches identification information about the object or information about time corresponding to the designated point, to the designated image, and superimposes the designated image on the background image.

Supplementary Note 8.

The video image processing device according to any of Supplementary notes 1 to 7, wherein the display control means, in accordance with one of a feature of the object shown in an analysis result obtained by analyzing the video image, a feature of another object related to the object shown in the analysis result, and an elapsed time from a predetermined time, makes a display mode of a part of the trajectory differ from another part or attach information indicating one of the analysis result and the elapsed time to a vicinity of a part of the trajectory.

Supplementary Note 9.

A video image analysis system comprising:

a tracking means that analyzes a video image, and continuously acquires a position of a tracking target object from the video image; a storage means that stores position information indicating the position acquired by the tracking means in association with identification information about an image from which the position was acquired in the video image; and a display control means that causes a display unit to display a trajectory indicating a change in the position of the object in the video image, based on the information stored in the storage means, wherein the display control means acquires a first request designating a point in the trajectory being displayed, and displays a designated image including the object which it was located at the designated point by superimposing it on an arbitrary background image being displayed on the display unit.

Supplementary Note 10.

A video image processing method comprising:

causing a display unit to display a trajectory indicating a change in a position of an object in a video image; acquiring a first request designating a point in the trajectory being displayed; and displaying a designated image including the object which it was located at the designated point by superimposing it on an arbitrary background image being displayed on the display unit.

Supplementary Note 11.

A video image processing program for causing a computer to:

perform a process of causing a display unit to display a trajectory indicating a change in a position of an object in a video image; in the process, acquire a first request designating a point in the trajectory being displayed; and display a designated image including the object which it was located at the designated point by superimposing it on an arbitrary background image being displayed on the display unit.

Although the present invention has been described with reference to this embodiment and examples, the present invention is not limited to the above embodiments and examples. Various changes that can be understood by those skilled in the art within the scope of the present invention can be made to the configuration and details of the present invention.

This application claims priority based on Japanese Patent Application 2017-070667, filed Mar. 31, 2017, the entire disclosure of which is incorporated herein.

INDUSTRIAL APPLICABILITY

The present invention can be suitably used not only in surveillance, but also in checking a video image accompanied by analysis information. For example, the present invention can be suitably used in marketing to recognize the situations of customers from a video image taken in a store or in the vicinity of a specific item.

REFERENCE SIGNS LIST

100, 200: Video image analysis system
1: Video image input device
2: Video image analysis device
3: Storage device
4: Video image processing device
5: Display device
101: Video image input unit
102: Video image holding unit
103: Tracking unit
104: Analysis information storage unit
105, 205: Display control unit
106: Display unit
1000: Computer
1001: CPU
1002: Main storage device
1003: Auxiliary storage device
1004: Interface
1005: Display device
1006: Input device
50: Video image processing device
501: Display control means

The invention claimed is:

1. A video image analyzing system comprising:
at least one memory configured to store instructions; and
at least one processor configured to execute the instructions to perform:
analyzing a video image, and detecting a tracking target object from the video image;
displaying a background image which is a composite image formed with images included in the video image at two or more points of time, and an image including an object region of the tracking target object included in another image generated when the tracking target object is located, on a display device,
displaying a trajectory indicating changes in position of the tracking target object, and
when the trajectory includes a roaming section in which the tracking target object is determined to be roaming, shortening the roaming section and displays the roaming section in a different display mode from other displayed sections.

2. The video image analyzing system according to claim 1,
wherein the at least one processor displays information about time when the tracking target object is located.

3. The video image analyzing system according to claim 1,
wherein the at least one processor receives designation of the tracking target object from a user.

4. The video image analyzing system according to claim 1,
wherein the at least one processor displays the image including the object region in the vicinity of a trajectory of the tracking target object.

5. The video image analyzing system according to claim 1,
wherein the background image corresponds to at least a part of a moving path of the tracking target object.

6. The video image analyzing system according to claim 1,
wherein the at least one processor displays an image representing a full body of a person as the image including the object region.

7. A video image analyzing method comprising:
analyzing a video image, and detecting a tracking target object from the video image;
displaying a background image which is a composite image formed with images included in the video image at two or more points of time, and an image including an object region of the tracking target object included in another image generated when the tracking target object is located, on a display device;

displaying a trajectory indicating changes in position of the tracking target object; and when the trajectory includes a roaming section in which the tracking target object is determined to be roaming, shortening the roaming section and displaying the roaming section in a different display mode from other displayed sections.

8. A non-transitory computer-readable recording medium in which a video image analyzing program is recorded, wherein the video image analyzing program causes a computer to perform:

a process of analyzing a video image, and detecting a tracking target object from the video image;

a process of displaying a background image which is a composite image formed with images included in the video image at two or more points of time, and an image including an object region of the tracking target object included in another image generated when the tracking target object is located, on a display device;

a process of displaying a trajectory indicating changes in position of the tracking target object; and a process of, when the trajectory includes a roaming section in which the tracking target object is determined to be roaming, shortening the roaming section and displaying the roaming section in a different display mode from other displayed sections.

* * * * *